United States Patent

Shimizu et al.

[11] Patent Number: 5,866,037
[45] Date of Patent: *Feb. 2, 1999

[54] LIQUID CRYSTAL COMPOSITIONS AND LIQUID CRYSTAL DISPLAY ELEMENTS CONTAINING SAME

[75] Inventors: Takaaki Shimizu; Tsutomu Ogihara; Tatsushi Kaneko; Toshiaki Takahashi; Mutsuo Nakashima; Takeshi Kinsho, all of Niigata-ken; Ryuichi Saito, Ibaraki-ken; Hideshi Kurihara, Tokyo, all of Japan

[73] Assignee: Shin-Etsu Chemical Co., Ltd., Tokyo, Japan

[*] Notice: The term of this patent shall not extend beyond the expiration date of Pat. No. 5,543,539.

[21] Appl. No.: 828,707

[22] Filed: Mar. 31, 1997

[30] Foreign Application Priority Data

Apr. 1, 1996 [JP] Japan ..................................... 8-079209
Mar. 27, 1997 [JP] Japan ..................................... 9-075124

[51] Int. Cl.$^6$ .......................... C09K 19/34; C09K 19/06; C09K 19/30
[52] U.S. Cl. ................ 252/299.61; 252/299.6; 252/299.63
[58] Field of Search ......................... 252/299.61, 299.63, 252/299.6

[56] References Cited

U.S. PATENT DOCUMENTS

| | | | |
|---|---|---|---|
| 5,498,737 | 3/1996 | Ogihara et al. | 556/406 |
| 5,527,490 | 6/1996 | Kinsho et al. | 252/299.61 |
| 5,543,539 | 8/1996 | Shimizu et al. | 252/299.61 |
| 5,547,606 | 8/1996 | Kinsho et al. | 252/299.61 |
| 5,560,866 | 10/1996 | Ogihara et al. | 252/299.61 |
| 5,567,350 | 10/1996 | Shimizu et al. | 252/299.61 |
| 5,573,705 | 11/1996 | Kaneko et al. | 252/299.61 |
| 5,578,244 | 11/1996 | Shimizu et al. | 252/299.61 |
| 5,582,764 | 12/1996 | Nakashima et al. | 252/299.61 |
| 5,595,686 | 1/1997 | Shimizu et al. | 252/299.61 |
| 5,624,601 | 4/1997 | Shimizu et al. | 252/299.61 |
| 5,641,430 | 6/1997 | Nakashima et al. | 252/299.61 |
| 5,650,092 | 7/1997 | Shimizu et al. | 252/299.61 |
| 5,679,746 | 10/1997 | Shimizu et al. | 252/299.61 |

FOREIGN PATENT DOCUMENTS

| | | |
|---|---|---|
| 0648773 | 4/1994 | European Pat. Off. . |
| 0630903 | 12/1994 | European Pat. Off. . |
| 0665232 | 8/1995 | European Pat. Off. . |
| 0668285 | 8/1995 | European Pat. Off. . |
| 0668286 | 8/1995 | European Pat. Off. . |
| 0670322 | 9/1995 | European Pat. Off. . |
| 0659753 | 6/1996 | European Pat. Off. . |

*Primary Examiner*—C. H. Kelly
*Attorney, Agent, or Firm*—McAulay Nissen Goldberg Kiel & Hand, LLP

[57] ABSTRACT

Liquid crystal compositions which can improve the low Δn (refractive index anisotropy) of conventional liquid crystal compositions containing a silacyclohexane compound and which retain a low viscosity and hence show no decrease in response speed. Liquid crystal compositions having a high Δn of 0.13 to 0.25, a low viscosity of 30 cp or less, a low threshold voltage and a high voltage holding ratio can be obtained by adding thereto, as a required component, a compound having both a silacyclohexane ring and a tolan structure, or a miture of a compound having a silacyclohexane ring and a compound having a tolan structure.

25 Claims, No Drawings

LIQUID CRYSTAL COMPOSITIONS AND LIQUID CRYSTAL DISPLAY ELEMENTS CONTAINING SAME

BACKGROUND OF THE INVENTION

1. Field of the Invention

This invention relates to liquid crystal compositions comprising compounds having a silacyclohexane ring, and liquid crystal display devices containing the same.

2. Description of the Related Art

Liquid crystal display devices are devices utilizing the optical anisotropy and dielectric anisotropy possessed by liquid crystal materials. According to the display mode, there are various types including the TN (twisted nematic), STN (super-twisted nematic), SBE (super-twisted birefringent effect), DS (dynamic scattering), guest-host, DAP (distortion of aligned phase) and OMI (optical mode interference) types. The most common display devices are ones having a twisted nematic structure on the basis of the Schutt-Hellfritt effect.

Although the properties required of the liquid crystal materials used in these liquid crystal display elements more or less vary according to the display mode, a wide liquid crystal temperature range and stability to moisture, air, light, heat and electric fields are commonly required for all display modes. Moreover, it is desired that the liquid crystal materials have low viscosity and provide a short addressing time, a low threshold voltage and high contrast in the cells. At present, there is no single compound that meets all of these requirements, and it is a matter of fact that liquid crystal mixtures obtained by mixing several or several tens of liquid crystal compounds and/or latent liquid crystal compounds are being used. Accordingly, it is also important that these components are easily miscible with each other.

Among the various display modes, the active matrix (AM)-driven twisted nematic (TN) mode using a thin film transistor (TFT) element array or thin film diode (TFD) element array is being extensively employed owing to its high image display quality (i.e., high fineness, high contrast and high response speed). On the other hand, the simple matrix-driven STN mode has achieved an improvement in display quality owing to the development of new driving methods such as the multi-line selection method, and is finding its own applications.

One of the cell design factors directly affecting the quality of display is retardation (R=d×Δn in which d is the cell gap size and Δn is the refractive index anisotropy of the liquid crystal material). In the TN mode, the first minimum of transmittance at which R=0.4–0.5 is chosen where visual angle characteristics are preferentially considered, and the second minimum of transmittance at which R=0.8–1.0 is chosen where contrast is preferentially considered. On the other hand, a value of R in the range of 0.8–0.9 is chosen in the STN mode.

Consequently, it is required that the Δn of the liquid crystal material be in the range of 0.08–0.09 for the first minimum of transmittance and in the range of 0.11–0.20 for the second minimum of transmittance and the STN mode.

In recent years, there is a growing demand for AM-driven TN mode liquid crystal panels predominantly using the first minimum of transmittance, and it is strongly desired to lower the driving voltages of liquid crystal materials, as well as the driving voltages of driver ICs. Conventional liquid crystal materials for use by low-voltage driving have the disadvantage that they show a rise in viscosity and hence a decrease in response time.

In the case of AM driving, it is required from reasons characteristic of this driving method that liquid crystal materials have what is called a signal voltage holding property. This signal voltage holding property designates the degree of drop of the signal voltage applied to picture elements containing a liquid crystal material, within a given frame period. Accordingly, when the signal voltage does not drop (i.e., when the voltage holding ratio is 100%), the alignment of the liquid crystal molecules is not broken and, therefore, no reduction in contrast is caused. Moreover, this voltage holding property is affected by the environment in which the liquid crystal panel is used, so that the lifetime of the property tends to be shortened in an environment exposed to high-intensity light as in liquid crystal panels for projection use, and in an environment exposed to high temperatures as in liquid crystal panels for use on automobiles. The threshold voltage of a liquid crystal material can be lowered by increasing its dielectric constant anisotropy ($\Delta\epsilon$). However, liquid crystal materials having high $\Delta\epsilon$ have the disadvantage that they fail to achieve a high voltage holding ratio.

SUMMARY OF THE INVENTION

Conventional liquid crystal compositions containing a silacyclohexane compound, which we have hitherto applied for patent, have a low Δn of 0.11 or less. The Δn can be increased to 0.13 or so by improving the formulation thereof. On the other hand, the viscosity rises to 30 cP or above and causes a decrease in response speed. Moreover, it has been impossible to prepare a liquid crystal composition having a higher Δn up to 0.250.

According to the present invention, liquid crystal compositions having a high Δn of 0.13 to 0.25, a low viscosity of 30 cP or less, a low threshold voltage and a high voltage holding ratio can be obtained by adding thereto, as a required component, a compound having both a silacyclohexane ring and a tolan structure of the formula

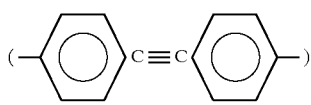

or a mixture of a compound having the silacyclohexane ring and a compound having the tolan structure.

The present invention provides a liquid crystal composition comprising one or more compounds wherein at least one of the compounds contains a trans-1-sila-1,4-cyclohexylene, or trans-4-sila-1,4-cyclohexylene group, and at least one of the compounds is of the general formula (I)

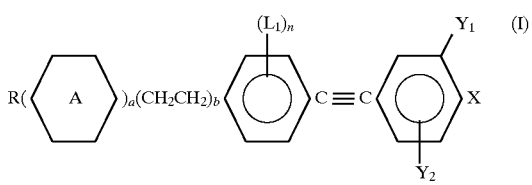

wherein
R is an alkyl group of 1 to 7 carbon atoms, an alkoxyalkyl group of 2 to 7 carbon atoms, a mono- or difluoroalkyl group of 2 to 7 carbons, or an alkenyl group of 2 to 7 carbons, a and b are each 0 or 1,

is a trans-1-sila-1,4-cyclohexylene, trans-4-sila-1,4-cyclohexylene or trans-1,4-cyclohexylene group, X is H, F, Cl, $OCHF_2$, $OCF_3$, $CF_3$, $(O)_sC_pH_qF_r$ [wherein s is 0 or 1, p is 2, 3 or 4, and (q+r)=(2p+1)], $(O)_sCY=CX_1X_2$ [wherein $X_1$ and Y are each H, F or Cl, and $X_2$ is F or Cl], an alkyl group of 5 or less carbon atoms, or an alkoxy group of 5 or less carbon atoms, $Y_1$ and $Y_2$ are each H or F, $L_1$ is F, and n is 0, 1 or 2, Moreover, the present invention provides a liquid crystal composition comprising one or more compounds of the general formula (I) and one or more compounds having a silacyclohexane ring.

The present invention provides a liquid crystal composition comprising one or more compounds of the general formula (Ia), (Id), or (Ig), and one or more of compounds of the general formula (Ib), (Ic), (Ie) or (If)

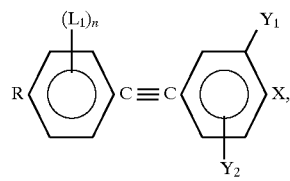

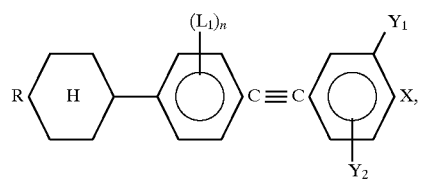

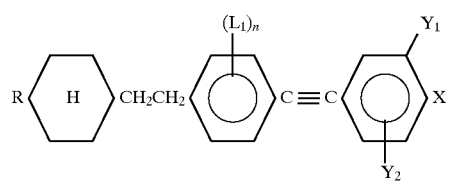

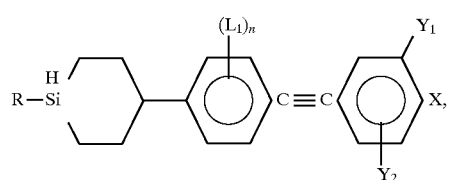

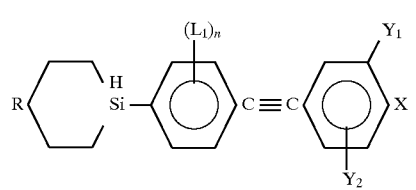

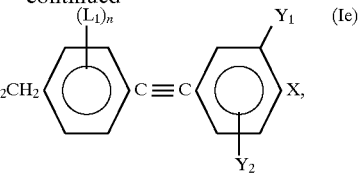

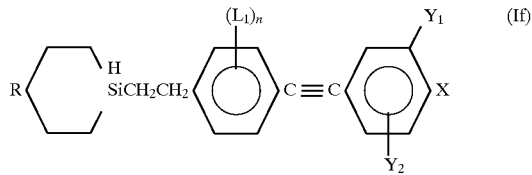

wherein R, X, $Y_1$, $Y_2$, $L_1$, n are as defined for the general formula (I).

The present invention provides a liquid crystal composition comprising at least one compound of the above general formula (I) and at least one compound of the general formula (II)

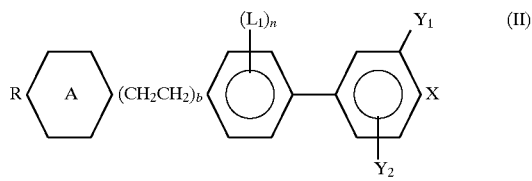

wherein

R is an alkyl group of 1 to 7 carbon atoms, an alkoxyalkyl group of 2 to 7 carbon atoms, a mono- or difluoroalkyl group of 2 to 7 carbon atoms, or an alkenyl group of 2 to 7 atoms, b is 0 or 1,

is a trans-1-sila-1,4-cyclohexylene, trans-4-sila-1,4-cyclohexylene or trans-1,4-cyclohexylene group, X is H, F, Cl, $OCHF_2$, $OCF_3$, $CF_3$, $(O)_sC_pH_qF_r$ [wherein s is 0 or 1, p is 2, 3 or 4, and (q+r)=(2p+1)], $(O)_sCY=CX_1X_2$ [wherein $X_1$ and Y are each H, F or Cl, and $X_2$ is F or Cl], an alkyl group of 5 or less carbon atoms, or an alkoxy group of 5 or less carbon atoms, $Y_1$ and $Y_2$ are each H or F, $L_1$ is F, and n is 0, 1 or 2.

However, at least one compound of the liquid crystal composition has to have a trans-1-sila-1,4-cyclohexylene or trans-4-sila-1,4-cyclohexylene group, although the compound does not have to be of the general formula (I) or (II).

The present invention provides a liquid crystal composition comprising at least one compound of the above general formula (I) and at least one compound of the general formula (III), (IV) or (V)

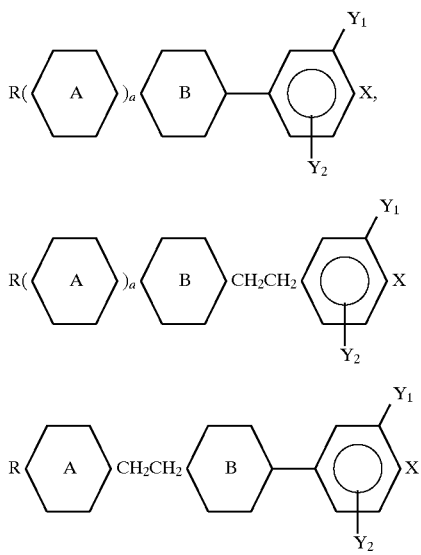

(III)

(IV)

(V)

wherein
R is an alkyl group of 1 to 7 carbon atoms, an alkoxyalkyl group of 2 to 7 carbon atoms, a mono- or difluoroalkyl group of 2 to 7 carbon atoms, or an alkenyl group of 2 to 7 atoms,
a is 0 or 1,

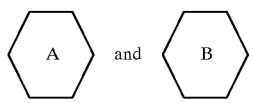

are each a trans-1-sila-1,4-cyclohexylene, trans-4-sila-1,4-cyclohexylene or trans-1,4-cyclohexylene group,
X is H, F, Cl, $OCHF_2$, $OCF_3$, $CF_3$, $(O)_sC_pH_qF_r$ [wherein s is 0 or 1, p is 2, 3 or 4, and $(q+r)=(2p+1)$], $(O)_sCY=CX_1X_2$ [wherein $X_1$ and Y are each H, F or Cl, and $X_2$ is F or Cl], an alkyl group of 5 or less carbon atoms, or an alkoxy group of 5 or less carbon atoms, and $Y_1$ and $Y_2$ are each H or F.

However, at least one compound of the liquid crystal composition has to have a trans-1-sila- 1,4-cyclohexylene or trans-4-sila-1,4-cyclohexylene group, although the compound does not have to be of the general formula (I), (III),(IV), or (V).

The present invention provides a liquid crystal composition comprising at least one compound of the above general formula (I), at least one compound of the above general formula (II), and at least one compound of the above general forumula (III), (IV), or (V). However, at least one compound of the liquid crystal composition has to have a trans-1-sila-1,4-cyclohexylene or trans-4-sila-1,4-cyclohexylene group, although the compound does not have to be of the general formula (I), (II), (III),(IV), or (V).

The present invention provides a liquid crystal composition comprising at least one compound of the general formula (I), and at least one compound of the general formula (VI), (VII) or (VIII)

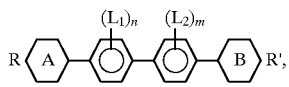

(VI)

-continued

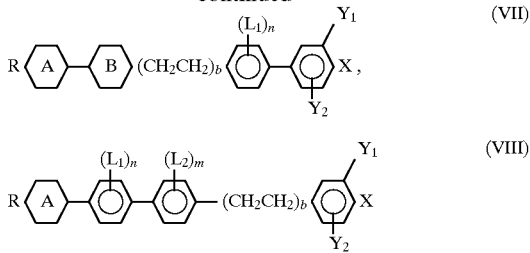

(VII)

(VIII)

wherein
R and R' are each an alkyl group of 1 to 7 carbon atoms, an alkoxyalkyl group of 2 to 7 carbon atoms, a mono- or difluoroalkyl group of 2 to 7 carbon atoms, or an alkenyl group of 2 to 7 carbon atoms,
b is 0 or 1,

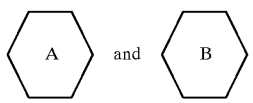

are each a trans-1-sila-1,4-cyclohexylene, trans-4-sila-1,4-cyclohexylene or trans-1,4-cyclohexylene group, X is H, F, Cl, $OCHF_2$, $OCF_3$, $CF_3$, $(O)_sC_pH_qF_r$ [wherein s is 0 or 1, p is 2, 3 or 4, and $(q+r)=(2p+1)$], $(O)_sCY=CX_1X_2$ [wherein $X_1$ and Y are each H, F or Cl, and $X_2$ is F or Cl], an alkyl group of 5 or less carbon atoms, or an alkoxy group of 5 or less carbon atoms,
$Y_1$ and $Y_2$ are each H or F,
$L_1$ and $L_2$ are each F, and
m and n are each 0, 1 or 2, However, at least one compound of the liquid crystal composition has to have a trans-1-sila-1,4-cyclohexylene or trans-4-sila-1,4-cyclohexylene group, although the compound does not have to be of the general formula (I), (VI),(VII), or (VIII).

The present invention provides a liquid crystal composition comprising at least one compound of the above general formula (I), at least one compound of the above general formula (II), and at least one compound of the above formula (VI), (VII) or (VIII). However, at least one compound of the liquid crystal composition has to have a trans-1-sila-1,4-cyclohexylene or trans-4-sila-1,4-cyclohexylene group, although the compound does not have to be of the general formula (I), (II), (VI), (VII), or (VIII).

The present invention provides a liquid crystal composition comprising at least one compound of the above general formula (I), at least one compound of the above general formula (II), at least one compound of the above general formula (III), (IV), or (V), and at least one compound of the above formula (VI), (VII) or (VIII). However, at least one compound of the liquid crystal composition has to have a trans-1-sila-1,4-cyclohexylene or trans-4-sila-1,4-cyclohexylene group, although the compound does not have to be of the general formula (I), (II), (III), (IV), (V), (VI), (VII), or (VIII).

The present invention provides a liquid crystal display elements containing these liquid crystal compositions.

On the basis of the relationship that T (response time) $\propto \eta \cdot d^2$ ($\eta$, viscosity; d, cell gap size), the decreased response speed can be improved by reducing the viscosity ($\eta$) and the cell gap size (d). On the other hand, according to the conditional restriction of display characteristics concerning $R = d \times \Delta n$, $\Delta n$ must be increased in order to reduce d.

The present invention relates to liquid crystal compositions comprising one or more compounds having high Δn of 0.13 or more and low viscosity of 30 cP or less and containing a conventionally unknown silacyclohexane ring in the molecular structure. These liquid crystal compositions can be used in the TN mode at the first and second minima and in the STN mode.

Moreover, these liquid crystal compositions have not only a low threshold voltage suitable for low-voltage driving and a high voltage holding ratio under severe conditions, but also a nematic liquid crystal phase over a wide temperature range, good mutual solubility of various liquid crystal compounds, and stability to moisture, air, light, heat and electric fields.

Thus, by incorporating one or more compounds having a silacyclohexane ring, the threshold voltage can be lowered without increasing Δε excessively, and a high voltage holding ratio can be achieved at the same time.

These liquid crystal compositions are useful in applications requiring high Δn and low viscosity, such as low-temperature poly-TFT liquid crystal panels for car navigators.

DETAILED DESCRIPTION OF PREFERRED EMBODIMENTS

The preparation methods of the compounds of the general formulae (I)–(VIII) have been published as shown in the following table.

References related to the syntheses of the compounds having formulas I–VIII

| Formula | JP Patent Publication No. (JP-A) | U.S. Pat. No. (UP-B) |
|---|---|---|
| I | 07-278157 | 5543539 |
| II | 07-173176 | *331957 |
|  | 07-278158 | 5523440 |
| III | 07-070148 | *514085 |
|  | 08-053469 |  |
|  | 08-231561 | *576619 |
|  | 08-253488 |  |
| IV | 08-215983 | 5496501 |
|  | 08-252273 | 5498737 |
| V | 08-109186 | 5547606 |
|  | 08-283275 | *598595 |
| VI | 07-228585 | 5573705 |
| VII | 07-291978 | 5582764 |
|  | 08-048689 |  |
| VIII | 07-324089 | 5578244 |
|  | 08-020589 |  |
|  | 08-092259 |  |

*U.S. patent application No. (UP-A)

The components constituting the liquid crystal compositions of the present invention are more specifically described hereinbelow.

Specific chemical structures represented by the general formula (I) are as follows:

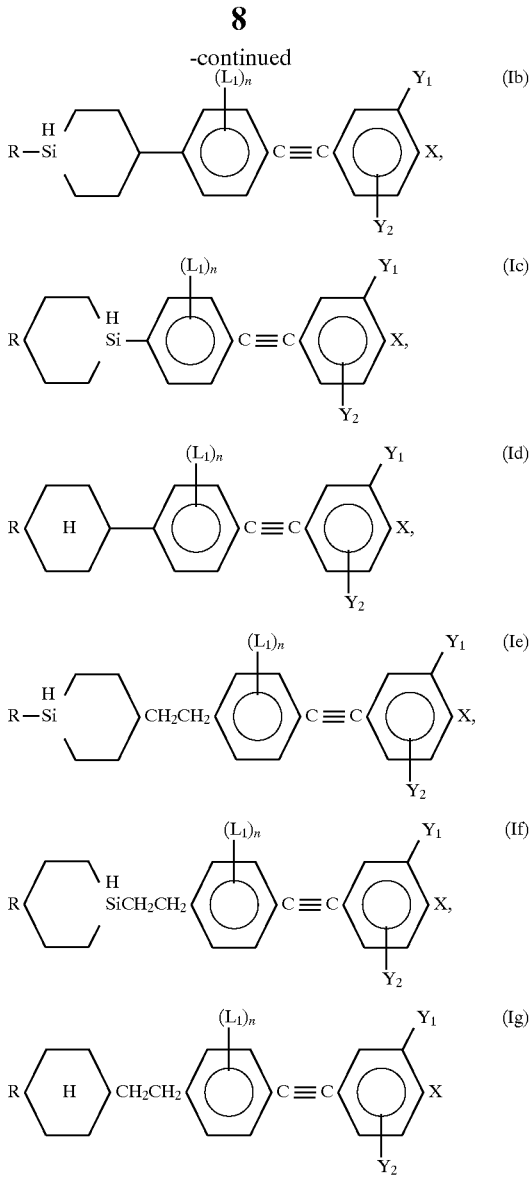

In the above formulae, R represents any of the following groups:

(a) Alkyl groups of 1 to 7 carbon atoms, including methyl, ethyl, n-propyl, n-butyl, n-pentyl, n-hexyl and n-heptyl.

(b) Alkoxyalkyl groups of 2 to 7 carbon atoms, including methoxymethyl, 2-methoxyethyl, 3-methoxypropyl, 4-methoxybutyl, 5-methoxypentyl, 6-methoxyhexyl, ethoxymethyl, 2-ethoxyethyl, 3-ethoxypropyl, 4-ethoxybutyl, 5-ethoxypentyl, (n-propoxy)methyl, 2-(n-propoxy)ethyl, 3-(n-propoxy)propyl, 4-(n-propoxy)butyl, (n-butoxy)methyl, 2-(n-butoxy)ethyl, 3-(n-butoxy)propyl, (n-pentoxy)methyl, 2-(n-pentoxy)ethyl and (n-hexyloxy)methyl.

(c) Mono- and difluoroalkyl groups of 2 to 7 carbon atoms, including 1-fluoroethyl, 1-fluoropropyl, 1-fluorobutyl, 1-fluoropentyl, 1-fluorohexyl, 1-fluoroheptyl, 2-fluoroethyl, 2-fluoropropyl, 2-fluorobutyl, 2-fluoropentyl, 2-fluorohexyl, 2-fluoroheptyl, 3-fluoropropyl, 3-fluorobutyl, 3-fluoropentyl, 3-fluorohexyl, 3-fluoroheptyl, 4-fluorobutyl, 4-fluoropentyl, 4-fluorohexyl, 4-fluoroheptyl, 5-fluoropentyl, 5-fluorohexyl, 5-fluoroheptyl, 6-fluorohexyl, 6-fluoroheptyl, 7-fluoroheptyl, 1,1-difluoroethyl, 1,1-difluoropropyl, 1,1-difluorobutyl, 1,1-difluoropentyl, 2,2- difluoroethyl, 2,2-difluoropropyl, 2,2-difluorobutyl, 2,2-difluoropentyl, 3,3-difluoropropyl, 3,3-difluorobutyl, 3,3-difluoropentyl, 4,4-difluorobutyl, 4,4-difluoropentyl and 5,5-difluoropentyl.

(d) Alkenyl groups of 2 to 7 carbon atoms, including vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4E-hexenyl, 4Z-hexenyl, 4E-heptenyl, 4Z-heptenyl, 5-hexenyl, 5E-heptenyl, 5Z-heptenyl and 6-heptenyl.

In the general formula (I), X is H, F, Cl, $OCHF_2$, $OCF_3$, $CF_3$, $(O)_sC_pH_qF_r$ [wherein s is 0 or 1, p is 2, 3 or 4, and $(q+r)=(2p+1)$], $(O)_sCY=CX_1X_2$ (wherein $X_1$ and Y are each H, F or Cl, and $X_2$ is F or Cl), an alkyl group of 5 or less carbon atoms, or an alkoxy group of 5 or less carbon atoms.

Preferable specific examples of $(O)_sC_pH_qF_r$ are as follows:

$CH_2CH_2F$, $CH_2CHF_2$, $CH_2CF_3$, $CH_2CH_2CF_3$, $CF_2CH(F)CF_3$, $OCH_2CH_2F$, $OCH_2CHF_2$, $OCH_2CF_3$, $OCH_2CH_2CHF_2$, $OCH_2CH_2CF_3$, $OCH_2CF_2CHF_2$, $OCH_2CF_2CF_3$, $OCF_2CH(F)CF_3$ and $OCF_2CF_3$.

Preferable specific examples of $(O)_sCY=CX_1X_2$ are as follows:

$-CH=CF_2$, $-OCH=CF_2$, $-CF=CFH$, $-OCF=CFH$, $-CF=CF_2$, $-OCF=CF_2$, $-CF=CHCl$, $-CF=CCl_2$, $-CCl=CHCl$ and $-CH=CCl_2$.

In the general formula (I), $Y_1$ and $Y_2$ are each H or F, $L_1$ is F, and n is 0, 1 or 2.

In the general formula (I), the steric configurations of the silacyclohexane ring and the cyclohexane ring are both in trans form.

In the general formula (I), preferable specific examples of the partial skeleton structure

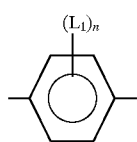

are as follows:

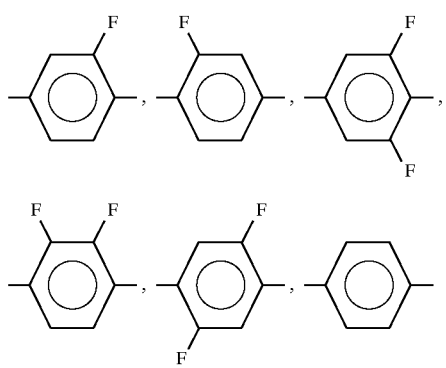

In the general formula (I), preferable specific examples of the partial skeleton structure (PS-1)

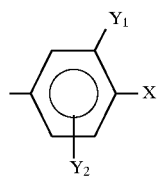

(PS-1)

are as follows:

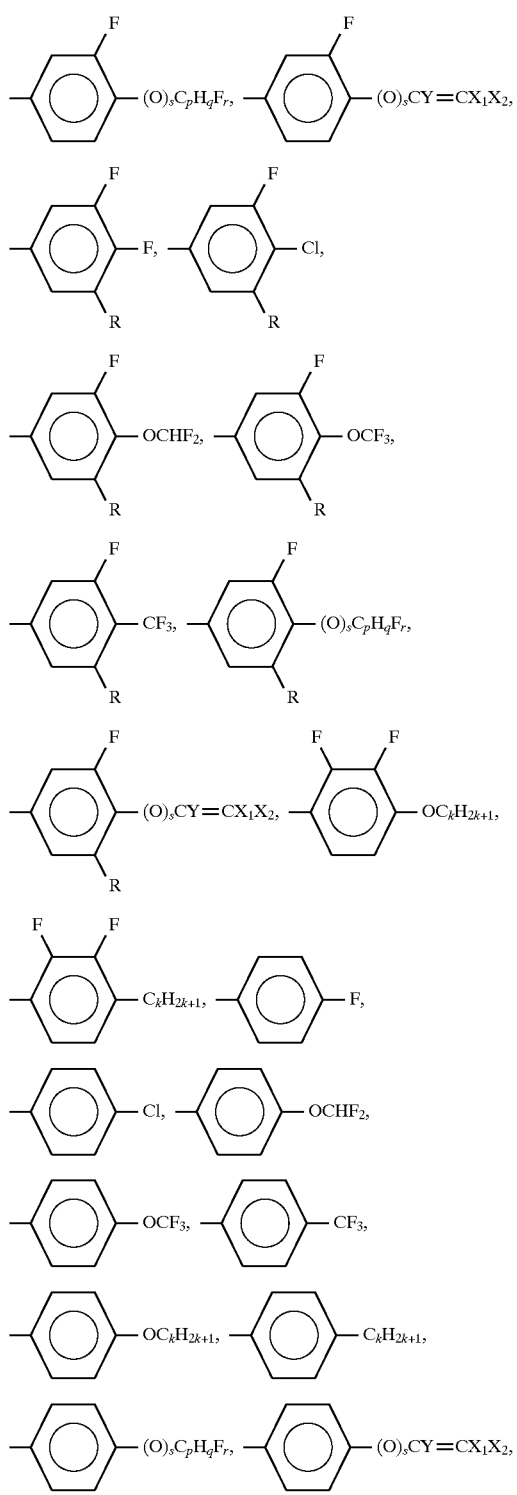

-continued

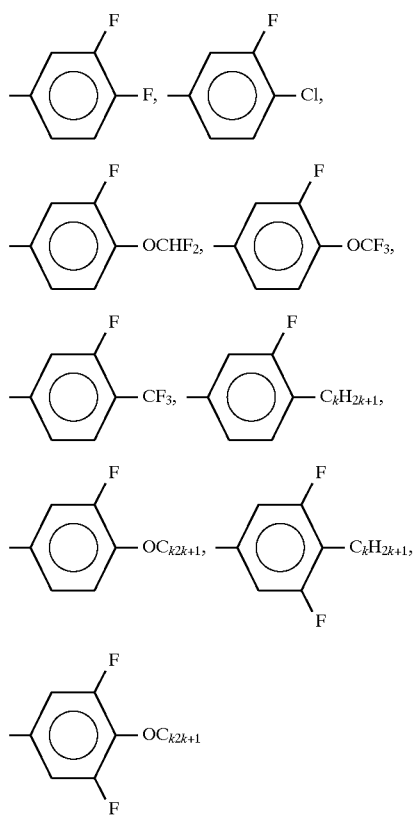

wherein k is an arbitrary integer in the range of 1 to 5.

The present invention provides a liquid crystal composition comprising one or more compounds wherein at least one of the compounds contains a trans-1-sila-1,4-cyclohexylene or trans-4-sila-1,4-cyclohexylene group and at least one of the compounds is the general formula (I). That is, the compound having a trans-1-sila-1,4-cyclohexylene or trans-4-sila-1,4-cyclohexylene group may or may not be the compound of the general formula (I). It is preferable to be the compound of the general formula (I).

The present invention provides a liquid crystal composition comprising one or more compounds of the general formula (I) and one or more of compounds having a silacyclohexane ring.

The present invention provides a liquid crystal composition, preferably comprising one or more tolan compounds having no silacyclohaxane ring such as a compound of the general formula (Ia), (Id) or (Ig), and one or more compounds having a silacyclohexane ring.

The present invention provides a liquid crystal composition, preferably comprising one or more tolan compounds having no silacyclohexane ring of the general formula (I) such as a compound of the general formula (Ia), (Id), or (Ig), and one or more tolan compounds having a silacyclohexane ring of the general formula (I) such as a compound of the general formula (Ib), (Ic), (Ie) or (If).

A compound of the general formula (Ib) or (Ie) is the most preferable of the compounds of the general formulae (Ib), (Ic), (Ie) and (If).

Specific chemical structures represented by the general formula (II) are follows:

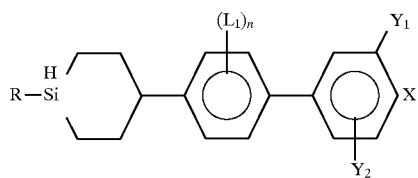

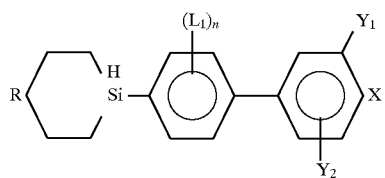

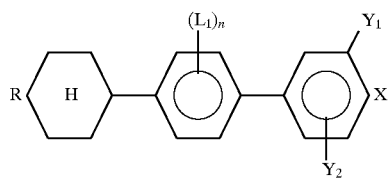

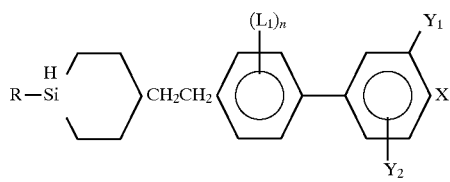

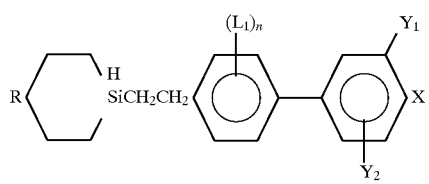

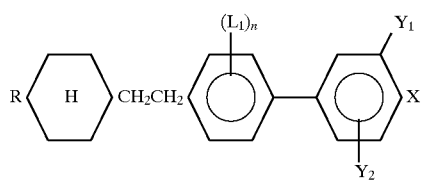

In the general formula (II), R, X, $Y_1$, $Y_2$, $L_1$ and n are as defined for the general formula (I), and the steric configurations of the silacyclohexane ring and the cyclohexane ring are both in trans form.

In the general formula (II), preferable specific examples of the partial skeleton structure (PS-2)

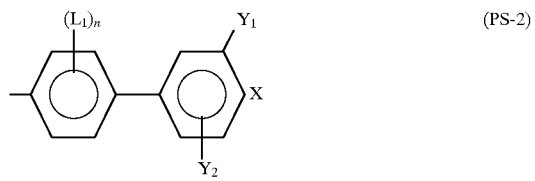

are as follows. In the following formulae, k is an arbitrary integer in the range of 1 to 5.

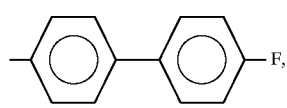

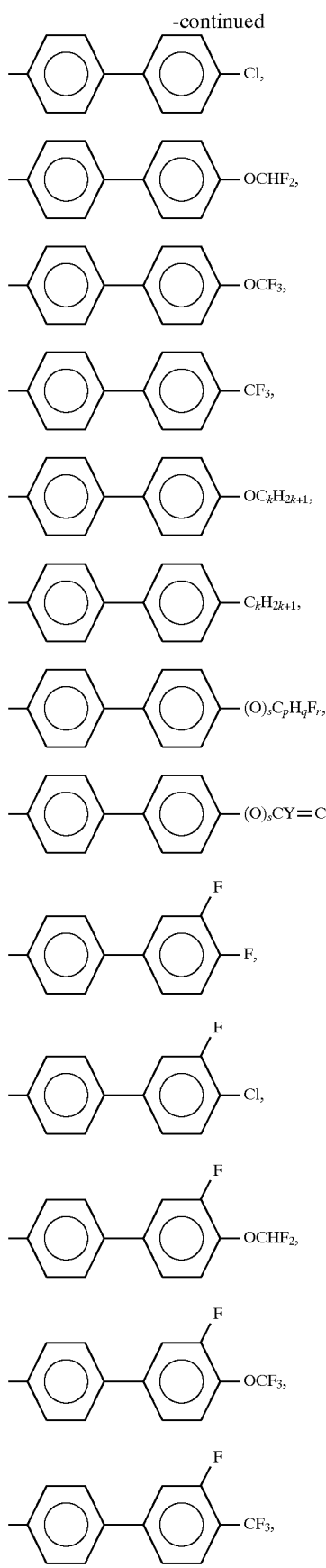
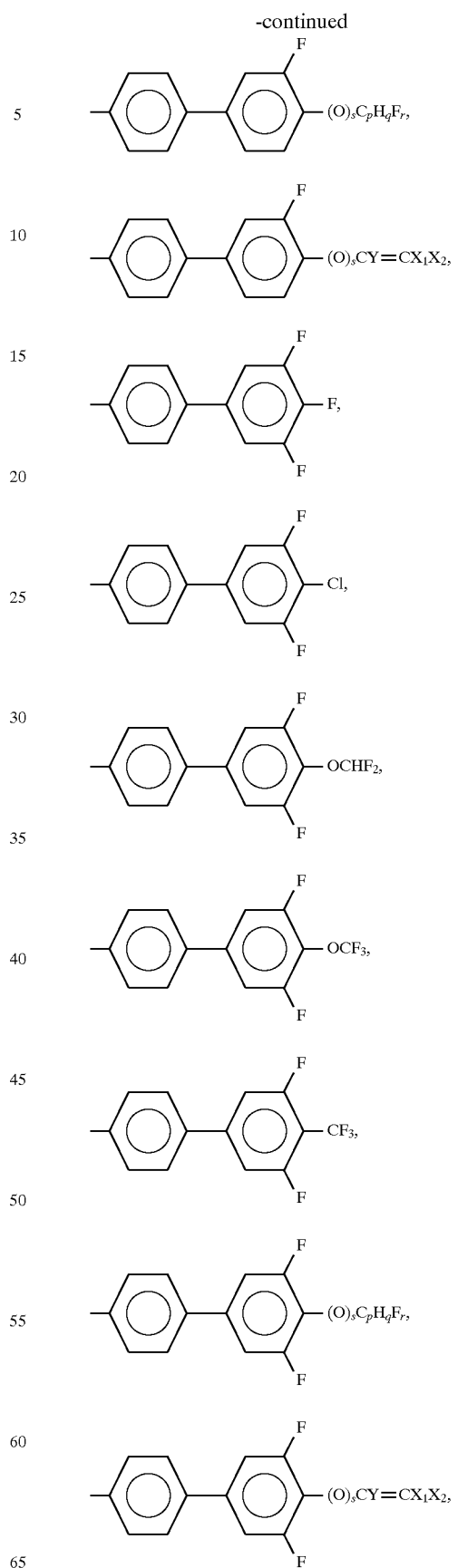

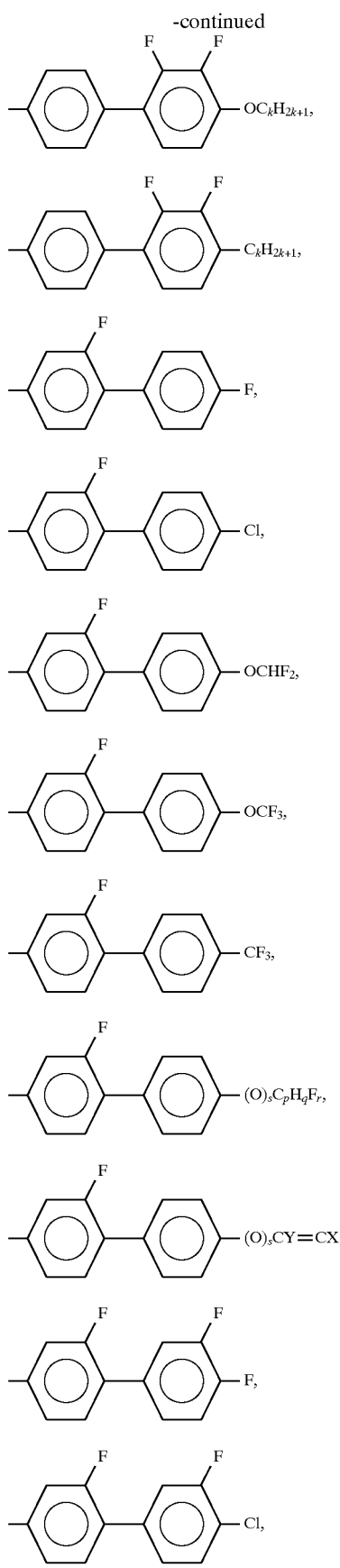
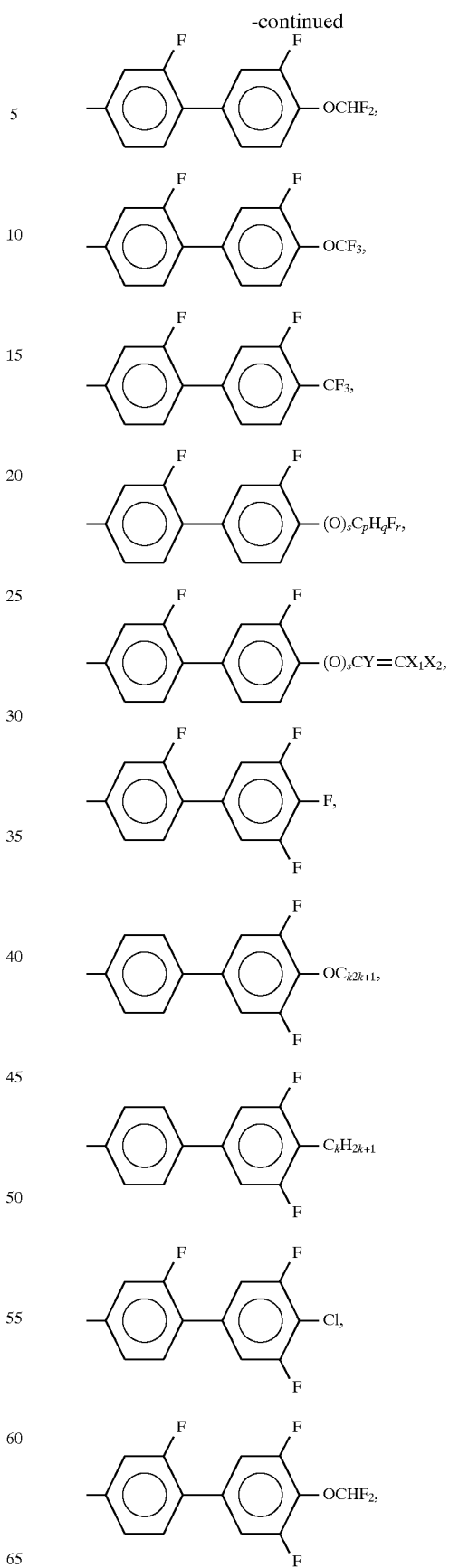

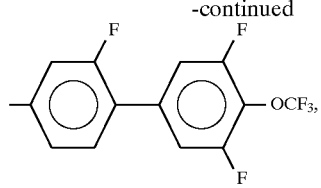
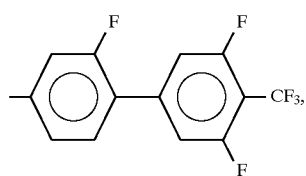
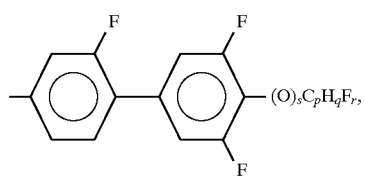
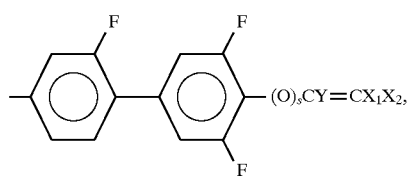
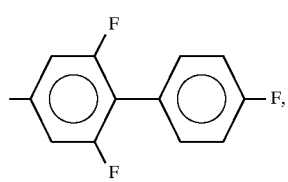
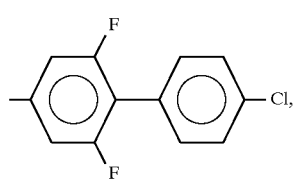
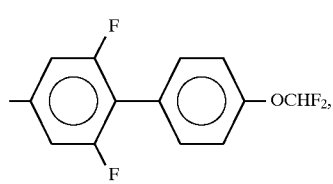
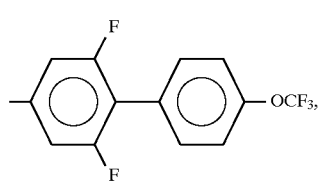
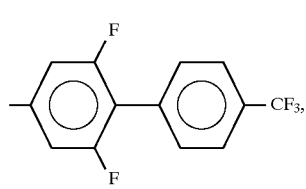
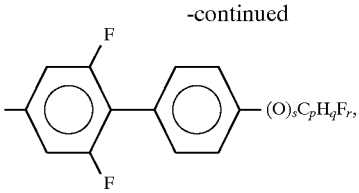
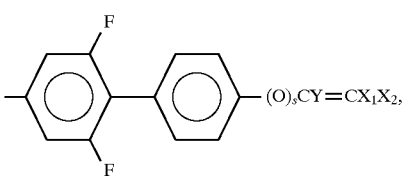
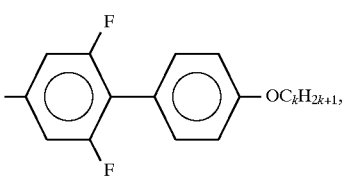
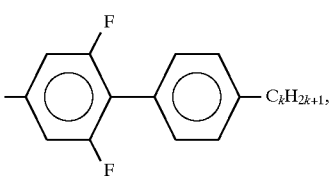
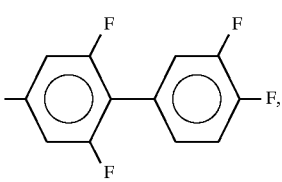
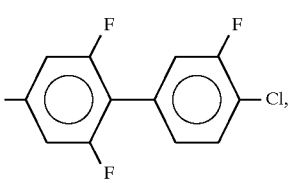
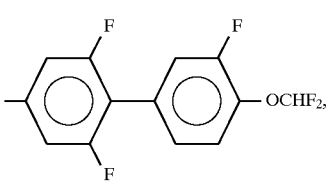
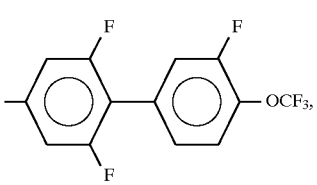
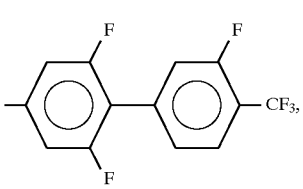

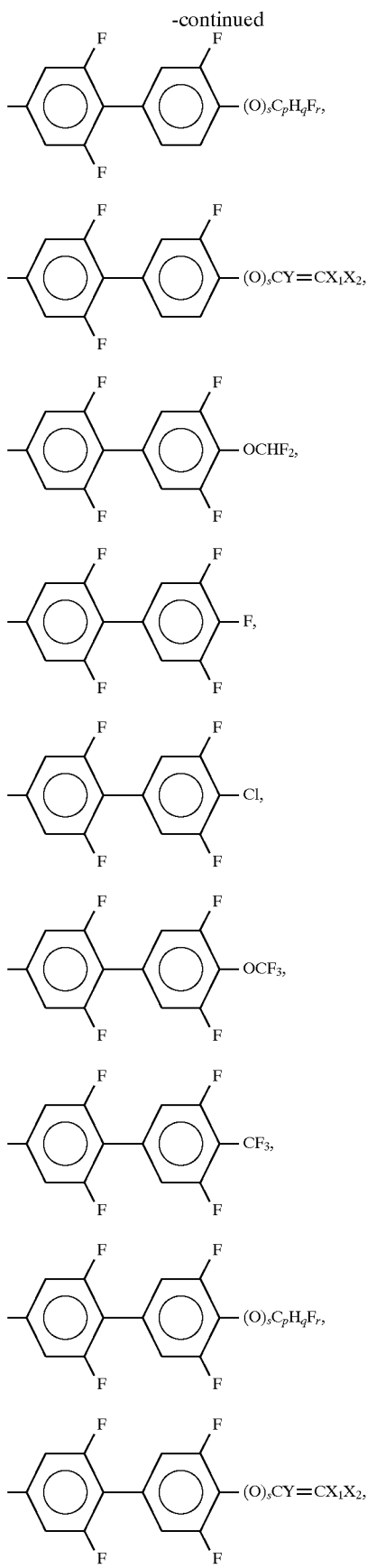

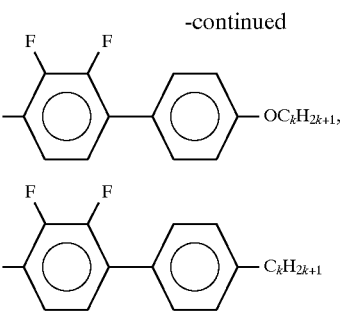

The present invention provides a liquid crystal composition comprising at least one compound of the general formula (I), at least one compound of the general formula (II), and at least one compound having a silacyclohexane ring.

The present invention provides a liquid crystal composition comprising at least one compound of the general formula (I), and at least one compound of the general formula (II). However, at least one compound of the liquid crystal composition has to have a trans-1-sila-1,4-cyclohexylene or trans-4-sila-1,4-cyclohexylene group, although the compound does not have to be of the general formula (I) or (II). It is preferable that the compound is of the general formula (I) or (II).

The present invention provides a liquid crystal composition, preferably comprising one or more compounds of the general formula (I), and one or more compounds having a silacyclohexane ring A of the general formula (II) such as a compound of the general formula (IIa), (IIb), (IId), or (IIe).

The present invention provides a liquid crystal composition, preferably comprising one or more tolan compounds having no silacyclohexane ring of the general formula (I) such as a compound of the general formula (Ia), (Id), or (Ig), and one or more tolan compounds having a silacyclohexane ring of the general formula (I) such as a compound of the general formula (Ib), (Ic), (Ie), or (If), in addition to one or more compounds of the general formula (II).

A compound of the general formula (Ib) or (Ie) is the most preferable of the compounds of the general formulae (Ib), (Ic), (Ie), and (If).

Specific chemical structures represented by the general formula (III) are as follows:

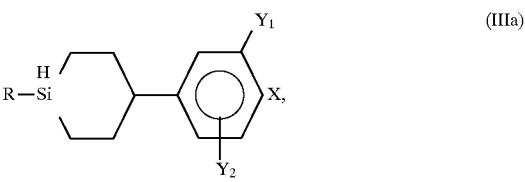
(IIIa)

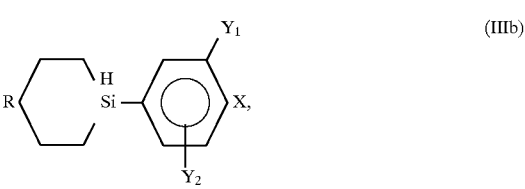
(IIIb)

-continued

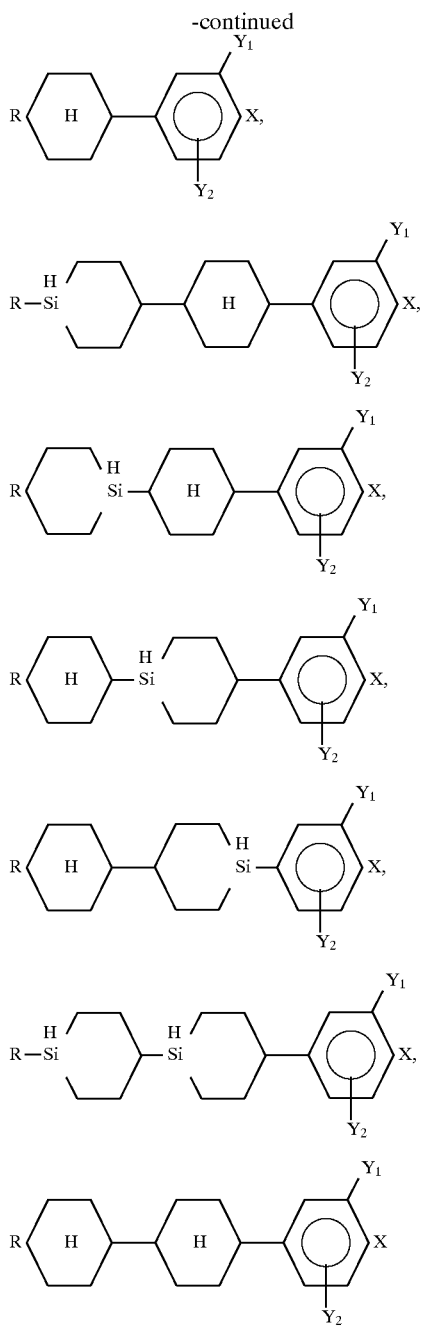

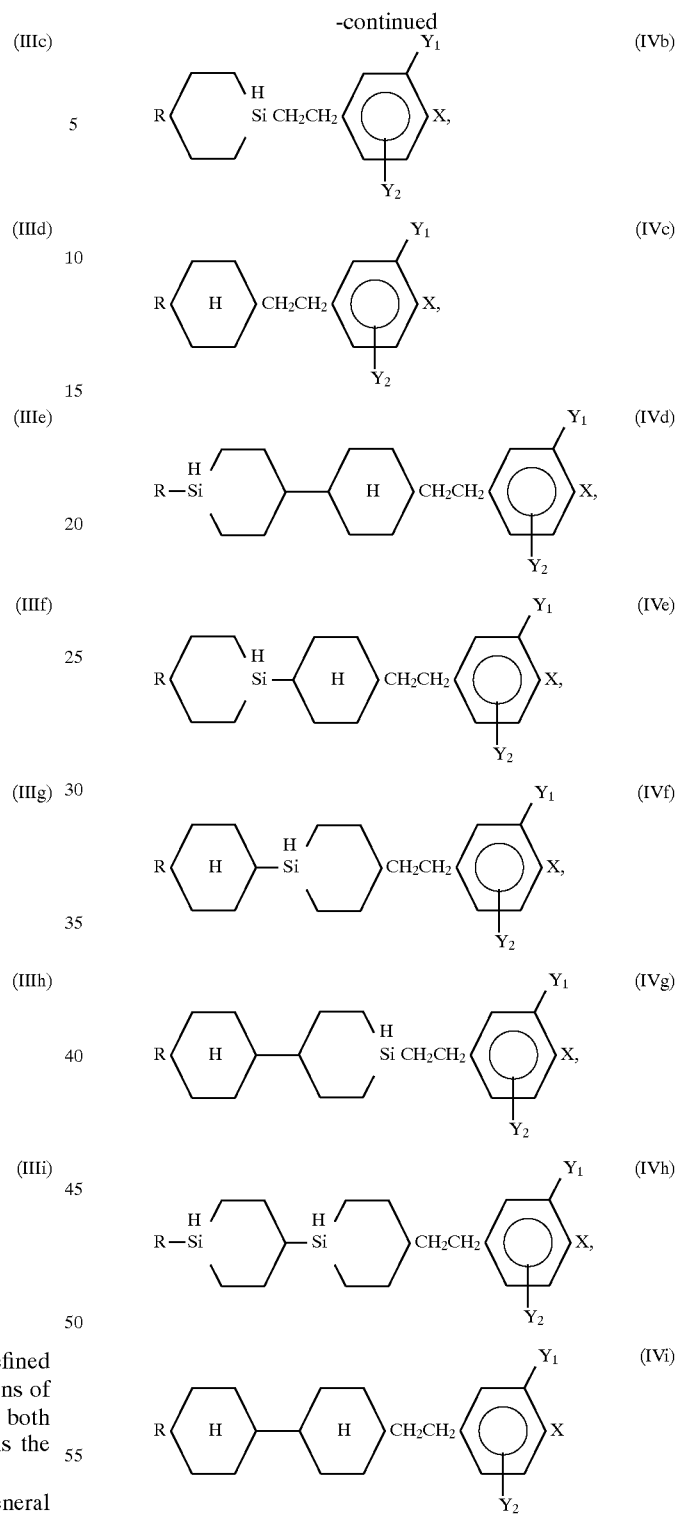

In the general formula (III), R, X, Y$_1$ and Y$_2$ are as defined for the general formula (I), and the steric configurations of the silacyclohexane ring and the cyclohexane ring are both in trans form. The partial skeleton structure (PS-1) is the same as in the general formula (I).

Specific chemical structures represented by the general formula (IV) are as follows:

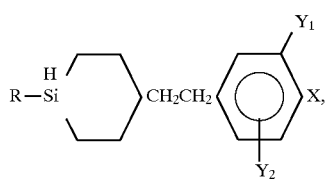

In the general formula (IV), R, X, Y$_1$ and Y$_2$ are as defined for the general formula (I), and the steric configurations of the silacyclohexane ring and the cyclohexane ring are both in trans form. The partial skeleton structure (PS-1) is the same as in the general formula (I).

Specific chemical structures represented by the general formula (V) are as follows:

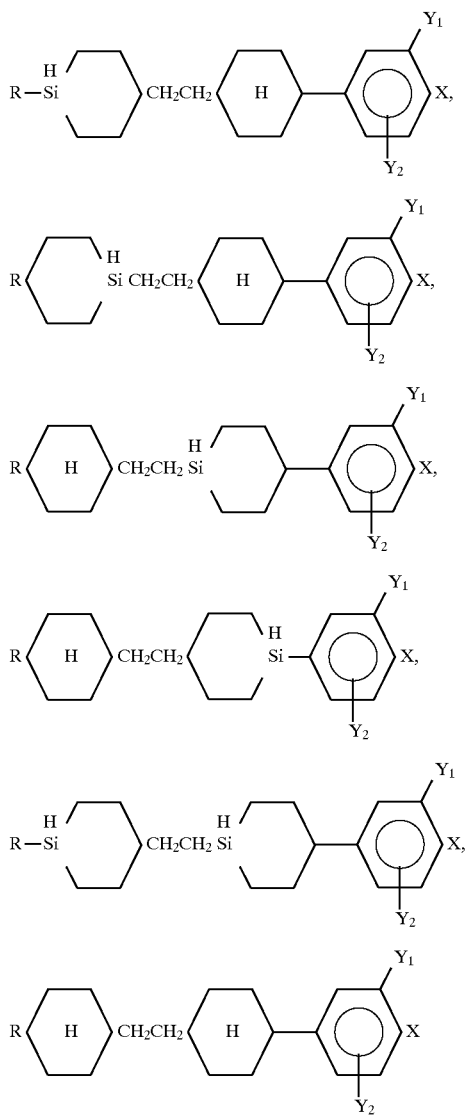

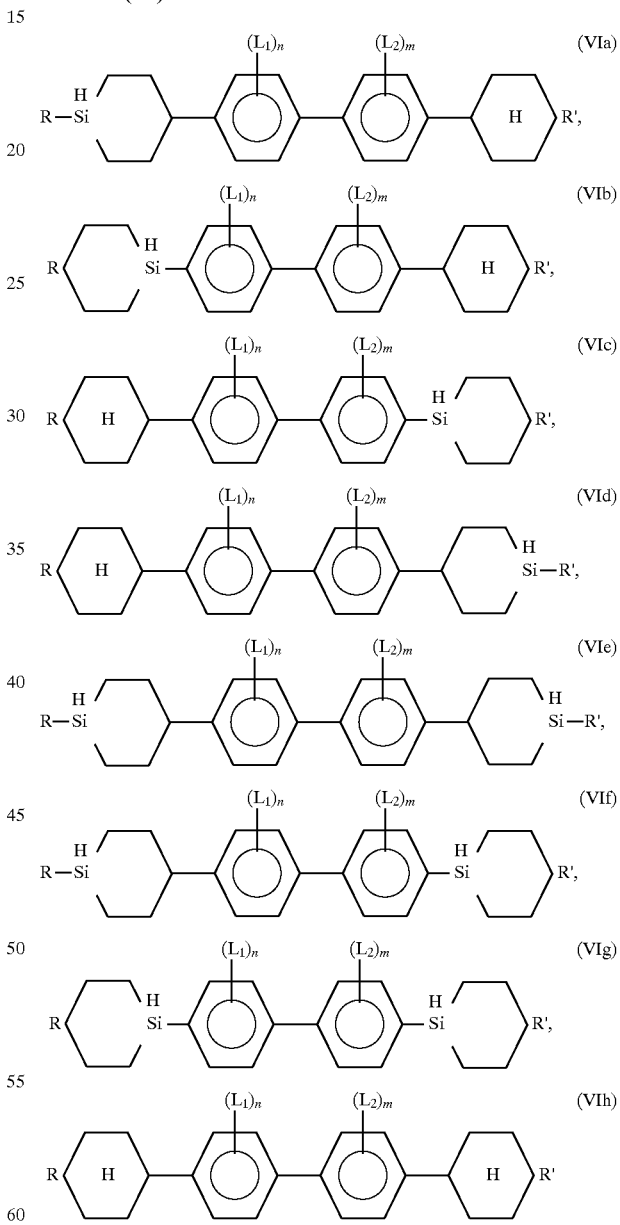

In the general formula (V), R, X, $Y_1$ and $Y_2$ are as defined for the general formula (I), and the steric configurations of the silacyclohexane and the cyclohexane ring are both in trans form. The partial skeleton structure (PS-1) is the same as in the general formula (I).

The present invention provides a liquid crystal composition comprising one or more compounds of the general formula (I), and one or more compounds having a silacyclohexane ring, and if necessary, one or more compounds of the general formula (III), (IV), or (V).

Moreover, the present invention provides a liquid crystal composition comprising one or more compounds of the general formula (I), one or more compounds of the general formula (II), and one or more compounds having a silacyclohexane ring, and if necessary, one or more compounds of the general formula (III), (IV), or (V).

The present invention provides a liquid crystal composition comprising one or more compounds wherein at least one of the compound is of general formula (I), and wherein at least one of the compound contains trans-1-sila-1,4-cyclohexylene or trans-4-sila-1,4-cyclohexylene group, and the liquid crystal composition may have, if necessary, one or more compounds of the general formula (III), (IV), or (V).

The present invention provides a liquid crystal composition comprising at least one compound of the general formula (I) and at least one compound of the general formula (II), and if necessary, one or more compounds of the general formula (III), (IV), or (V). However, one of the compounds of the liquid crystal composition has to have a trans-1-sila-1,4-cyclohexylene or trans-4-sila-1,4-cyclohexylene group, although the compound does not have to be of the general formula (I), (II), (III), (IV), or (V). It is preferable that the compound with a trans-1-sila-1,4-cyclohexylene or trans-4-sila-1,4-cyclohexylene group is the compound of the general formula (I),(II), (III), (IV), or (V).

The compound of the general formula (III) is the most preferable of the compounds of the general formulae (III), (IV), and (V).

Specific chemical structures represented by the general formula (VI) are as follows:

In the general formula (VI), R, $L_1$ and n are as defined for the general formula (I) and the steric configurations of the silacyclohexane ring and the cyclohexane ring are both in trans form.

R' is as defined for R, $L_2$ is F, and m is 0, 1 or 2.

In the general formula (VI), preferable specific examples of the partial skeleton structure (PS-3)

are as follows:
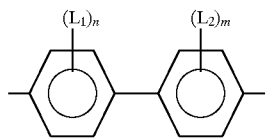
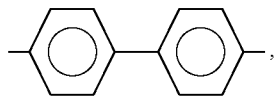
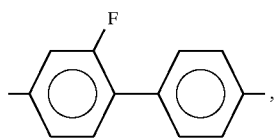
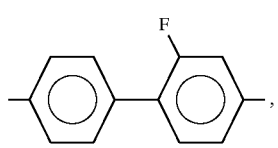
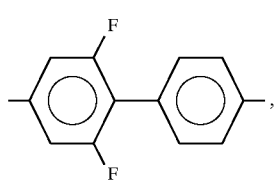
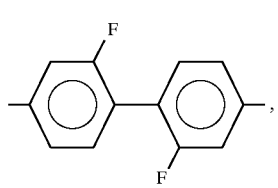
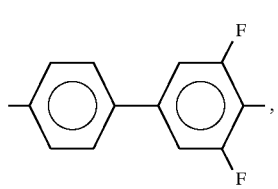
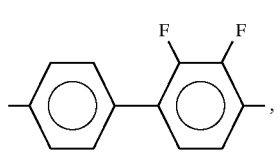
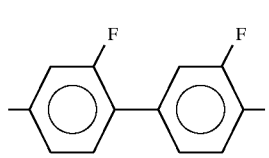
Specific chemical structures represented by the general formula (VII) are as follows:
(PS-3)
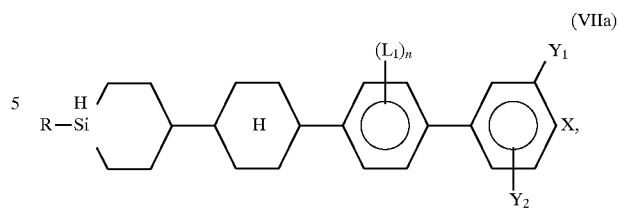 (VIIa)
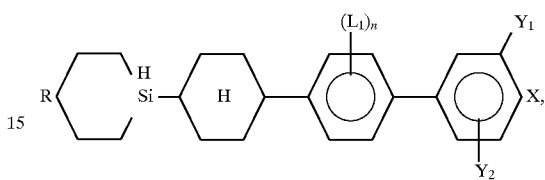 (VIIb)
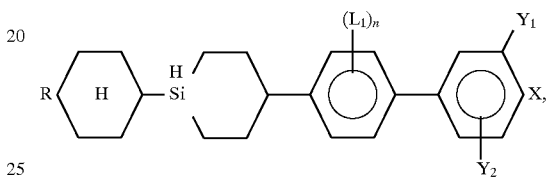 (VIIc)
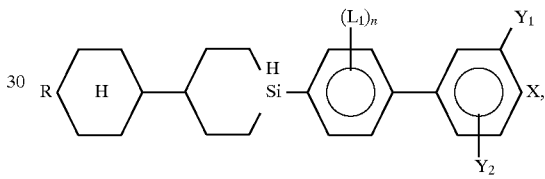 (VIId)
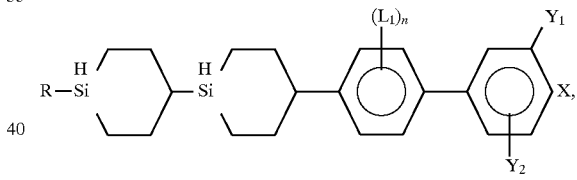 (VIIe)
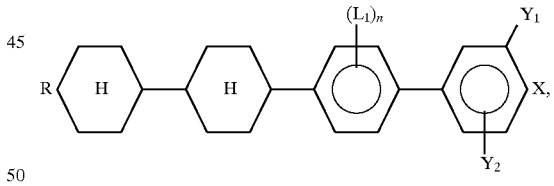 (VIIf)
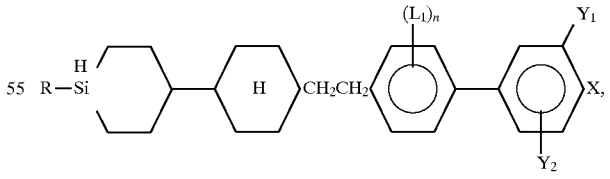 (VIIg)
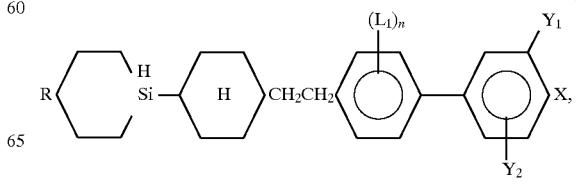 (VIIh)

(VIIi)
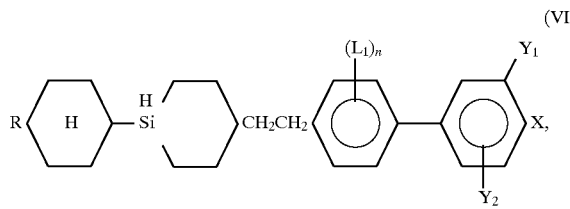

(VIIj)
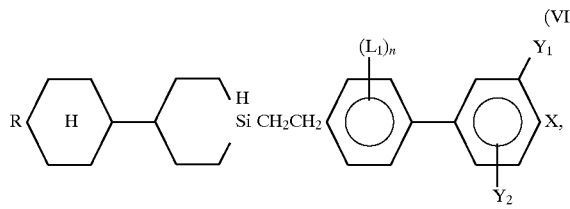

(VIIk)
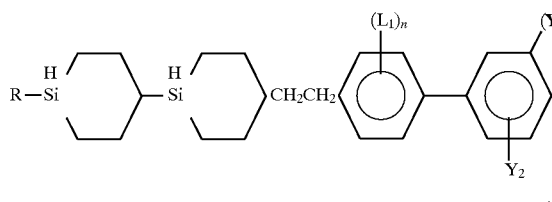

(VIII)
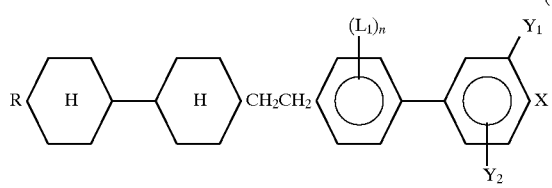

In the general formula (VII), R, X, Y₁, Y₂, L₁ and n are as defined for the general formula (I), and the steric configurations of the silacyclohexane ring and the cyclohexane ring are both in trans form. The partial skeleton structure (PS-2) is the same as in the general formula (II).

Specific chemical structures represented by the general formula (VIII) are as follows:

(VIIIa)
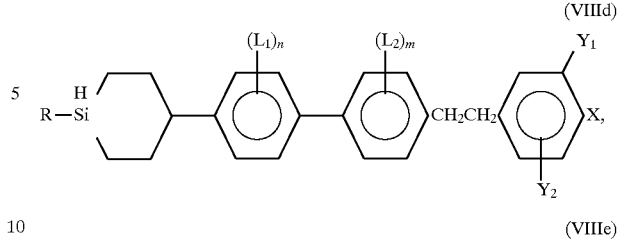

(VIIIb)
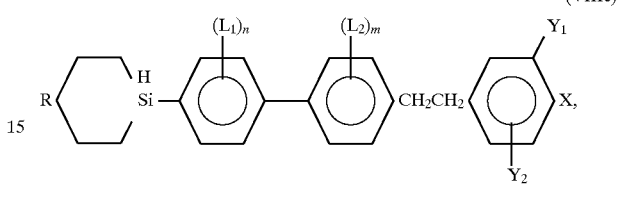

(VIIIc)
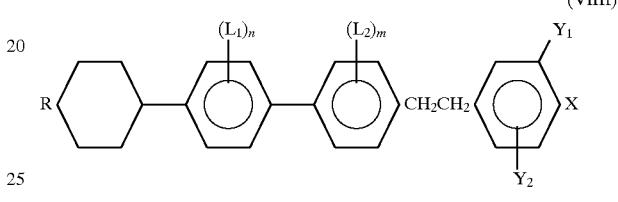

(VIIId)

(VIIIe)

(VIIIf)

In the general formula (VIII), R, X, Y₁, Y₂, L₁ and n are as defined for the general formula (I), and the steric configurations of the silacyclohexane ring and the cyclohexane ring are both in trans form.

Similarly to the general formula (VI), L₂ is F, and m is 0, 1 or 2.

In the general formula (VIII), preferable specific examples of the partial skeleton structure (PS-3)

(PS-3)
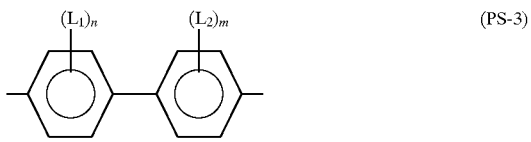

are as follows:

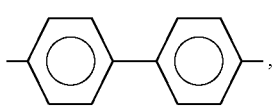

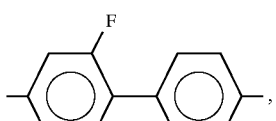

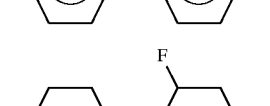

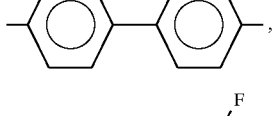

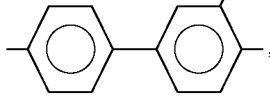

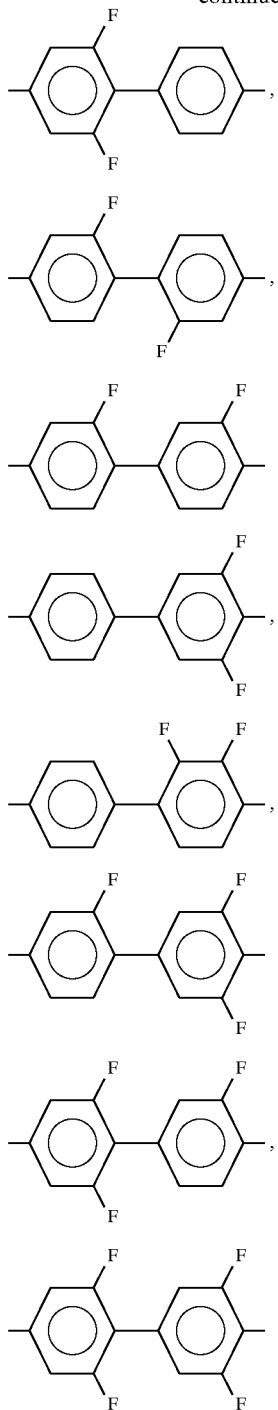

The partial skeleton structure (PS-1) is the same as in the general formula (I).

The present invention provides a liquid crystal composition comprising one or more compounds of the general formula (I) and one or more compounds having a silacyclohexane ring, and if necessary, one or more compound of the general formula (VI), (VII), or (VIII).

The present invention provides a liquid crystal composition comprising one or more compounds of the general formula (I), one or more compounds of the general formula (II) and one or more compounds having a silacyclohexane ring, and if necessary, one or more compound of the general formula (VI), (VII), or (VIII).

The present invention provides a liquid crystal composition comprising one or more compounds wherein at least one of the compound is of general formula (I), and wherein at least one of the compound contains trans-1-sila-1,4-cyclohexylene or trans-4-sila-1,4-cyclohexylene group, and the liquid crystal composition may have, if necessary, one or more compounds of the general formula (VI), (VII), or (VIII).

The present invention provides a liquid crystal composition comprising at least one compound of the general formula (I) and at least one compound of the general formula (II), and if necessary, one or more compounds of the general formula (VI), (VII), or (VIII). However, one of the compounds of the liquid crystal composition have to have a trans-1-sila-1,4-cyclohexylene or trans-4-sila-1,4-cyclohexylene group, although the compound does not have to be of the general formula (I), (II), (VI), (VII), or (VIII). It is preferable that the compound with a trans-1-sila-1,4-cyclohexylene or trans-4-sila-1,4-cyclohexylene group is the compound of the general formula (I), (II), (VI), (VII), or (VIII).

The present invention provides a liquid crystal composition comprising at least one compound of the general formula (I) and if necessary, one or more compounds of the general formula (II), (III), (IV), (V), (VI), (VII), or (VIII). However, one of the compounds of the liquid crystal composition have to have a trans-1-sila-1,4-cyclohexylene or trans-4-sila-1,4-cyclohexylene group, although the compound does not have to be of the general formula (I), (II), (III), (IV), (V), (VI), (VII), or (VIII). It is preferable that the compound with a trans-1-sila-1,4-cyclohexylene or trans-4-sila-1,4-cyclohexylene group is the compound of the general formula (I), (II), (III), (IV), (V), (VI), (VII), or (VIII).

The compound of the general formula (VI) or (VII) is the most preferable of the compounds of the general formulas (VI), (VII), (VIII).

When the compound of the general formula (VI), (VII), or (VIII) is used, it is more preferable to be used together with one or more compounds of the general formula (II).

Among the foregoing examples, the following ones are especially preferred because they can provide the liquid crystal composition with a nematic liquid crystal phase over a wide temperature range, a high response speed, a low threshold voltage, a high voltage holding ratio, and low-temperature nematic stability.

Preferred examples of R for the compounds of the general formulae (I)–(VIII) are as follows:

(e) Alkyl groups of 2 to 7 carbon atoms, including ethyl, n-propyl, n-butyl, n-pentyl, n-hexyl and n-heptyl.

(f) Alkoxyalkyl groups of 2 to 6 carbon atoms, including methoxymethyl, 2-methoxyethyl, 3-methoxypropyl, 5-methoxypentyl, ethoxymethyl, 2-ethoxyethyl, (n-propoxy)methyl and (n-pentoxy)methyl.

(g) Mono- and difluoroalkyl groups of 2 to 7 carbon atoms, including 2-fluoroethyl, 2-fluoropropyl, 4-fluorobutyl, 4-fluoropentyl, 5-fluoropentyl, 6-fluorohexyl, 7-fluoroheptyl, 1,1-difluoroethyl, 2,2-difluoroethyl, 2,2-difluoropropyl, 2,2-difluorobutyl, 4,4-difluorobutyl and 4,4-difluoropentyl.

(h) Alkenyl groups of 2 to 7 carbon atoms, including vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4E-hexenyl, 4Z-hexenyl, 4E-heptenyl, 4Z-heptenyl, 5-hexenyl and 6-heptenyl.

Preferred examples of the ring structures are (Ia), (Ib), (Id), (Ie), (Ig), (IIa), (IIc), (IId), (IIf), (IIIa), (IIIc), (IIId), (IIIf), (IIIi), (IVa), (IVc), (IVd), (IVf), (IVi), (Va), (Vf), (VIa), (VId), (VIe), (VIh), (VIIa), (VIIc), (VIIf), (VIIg), (VIIi), (VIII), (VIIIa), (VIIIc), (VIIId) and (VIIIf).

More preferred examples of the partial skeleton structure (PS-1) are as follows:
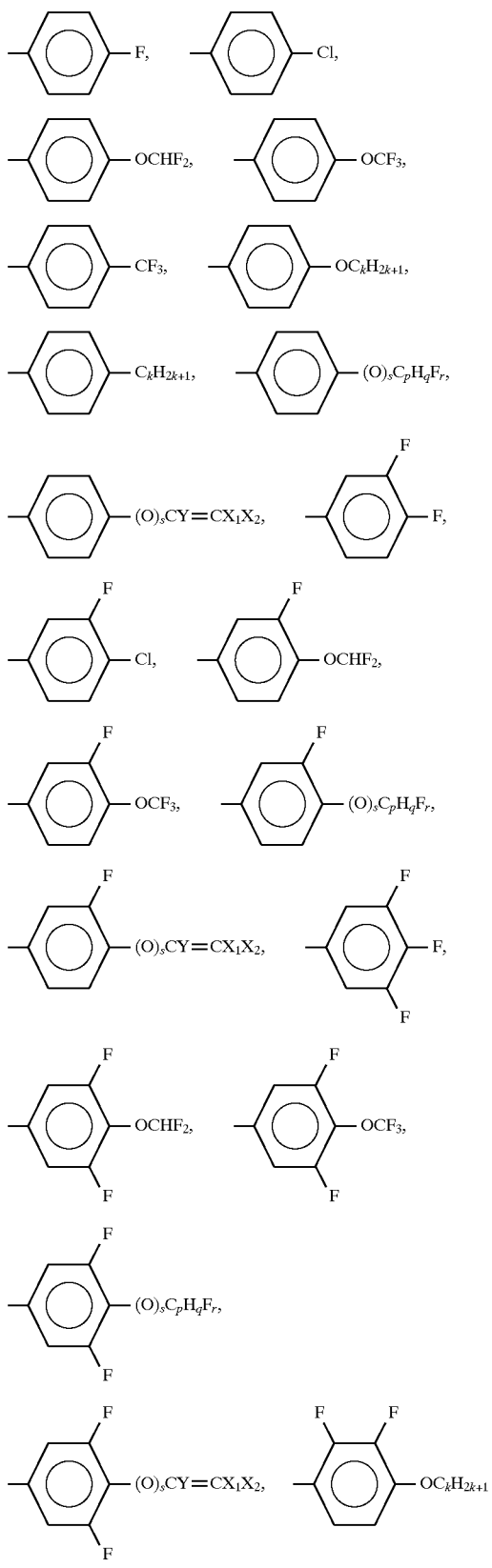
wherein k is an arbitrary integer in the range of 1 to 5.
More preferred examples of the partial skeleton structure (PS-2) are as follows. In the following formulae, k is an arbitrary integer in the range of 1 to 5.
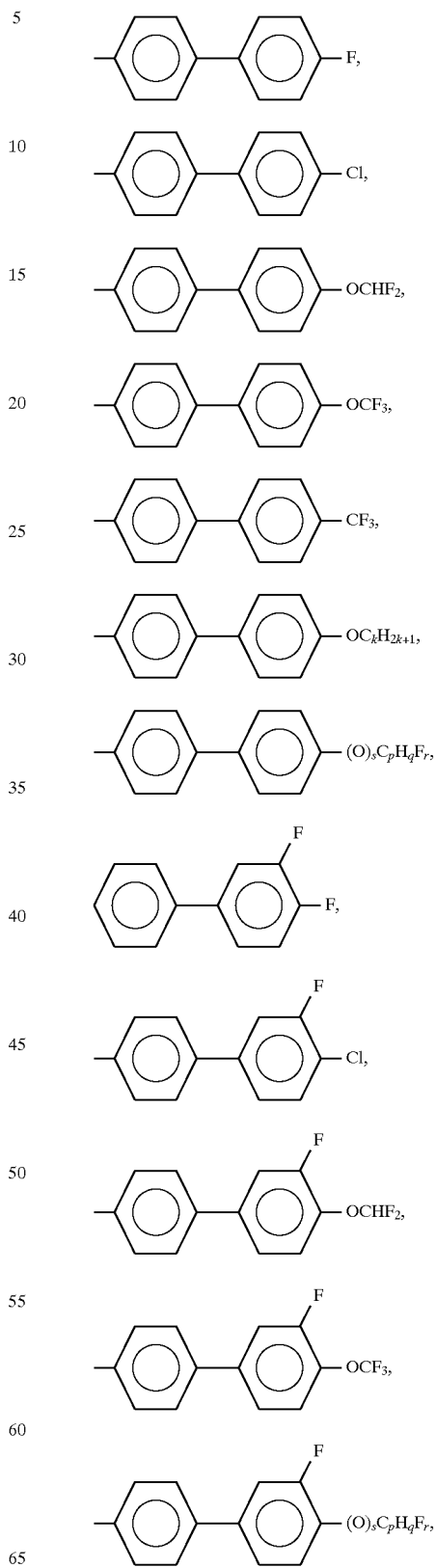

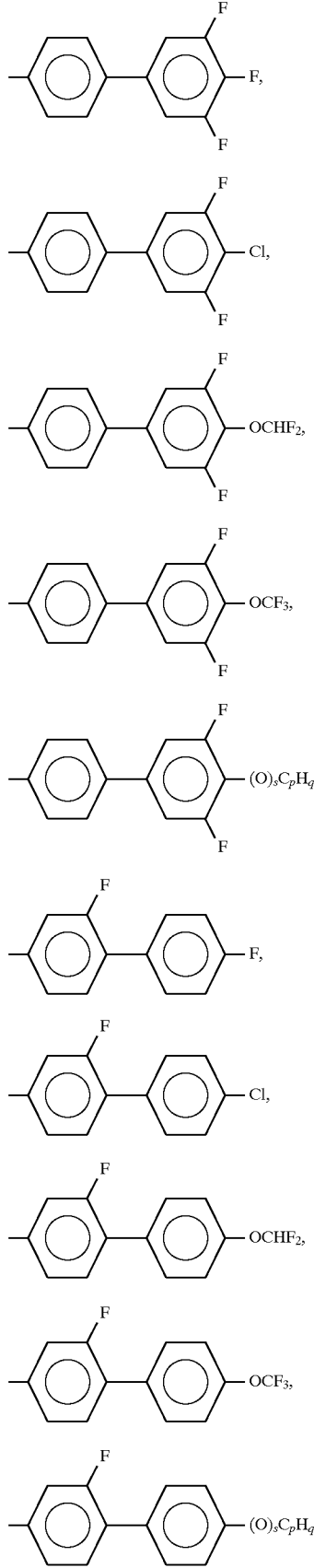
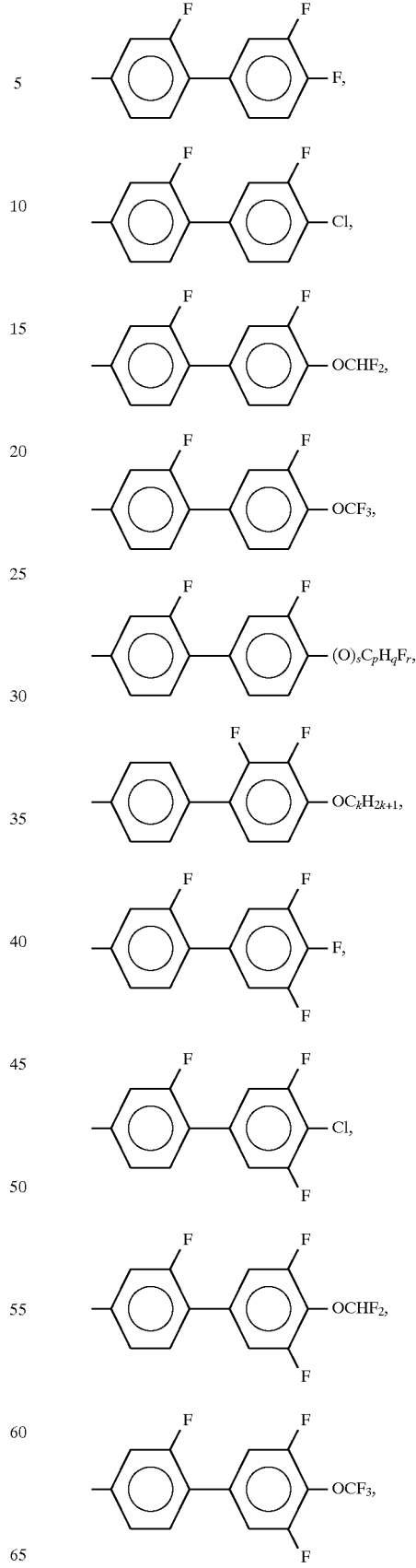

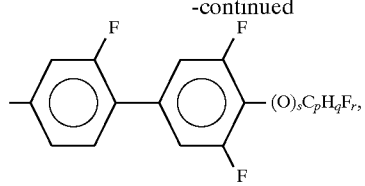
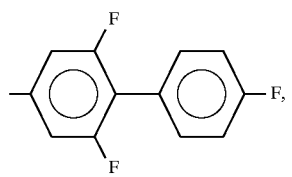
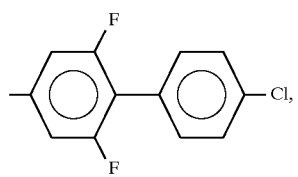
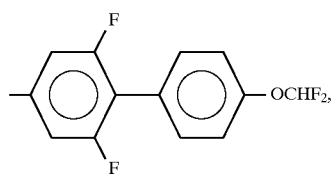
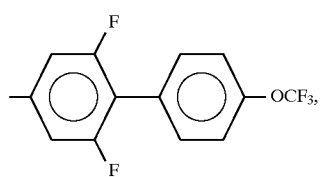
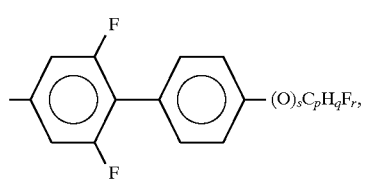
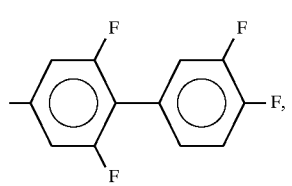
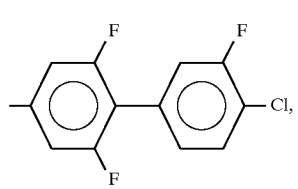
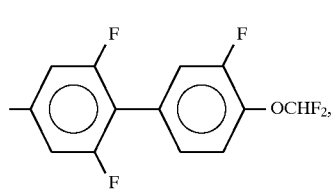
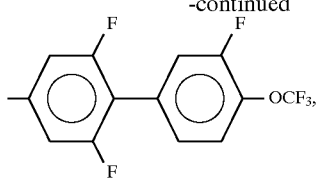
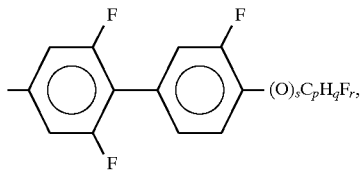
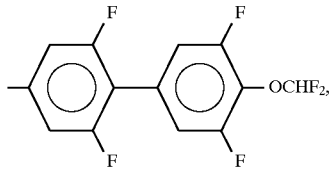
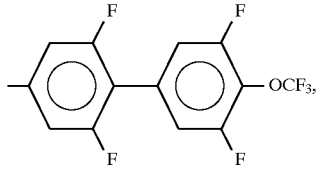
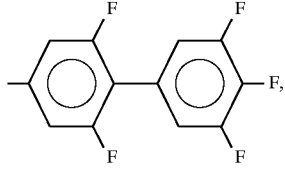
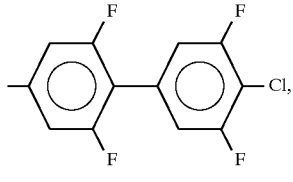
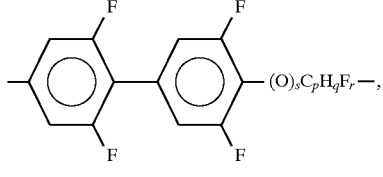
More preferred examples of the partial skeleton structure (PS-3) are as follows:
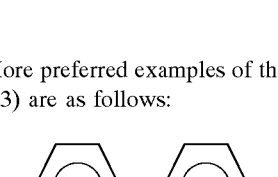
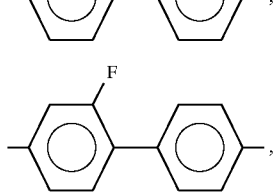

-continued

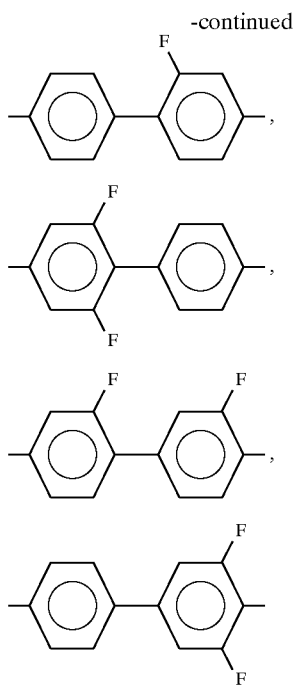

More preferred examples of the partial skeleton structure

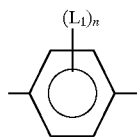

are as follows:

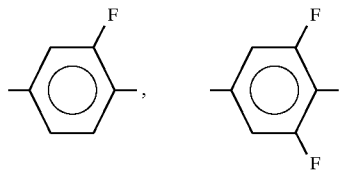

Now, the proportions of various components in the compositions of the present invention are described hereinbelow.

According to the present invention, one or more tolan compounds of the general formula (I) are preferably contained in total in 10 to 100 mol % of a total composition, while the other compound or compounds such as the compounds of the general formulae (II)–(VIII) are contained in total in 0 to 90 mol % of the total composition.

One or more compounds of the general formula (II), which are added if necessary, are preferably added in total in 0 to 400 mol % against a total amount of one or more compounds of the general formula (I).

One or more compounds of the general formula (III), (IV), or (V), which are added if necessary, are preferably added in 0 to 150 mol % against a total amount of one or more compounds of the general formula (I).

One or more compounds of the general formula (VI), (VII), or (VIII), which are added if necessary, are preferably added in 0 to 110 mol % against a total amount of one or more compounds of the general formula (I).

When a composition contains one or more compounds of the general formula (II), (III), (IV), (V), (VI), (VII), or (VIII), together with one or more compounds of the general formula (I), a compound or compounds having silane are contained preferably in total in 30 mol % or more of a total composition.

The refractive index anisotropy ($\Delta n$) is enhanced as the proportions of the compounds of the general formulae (I), (II), (VI), (VII) and (VIII) become higher. Among others, the compounds of the general formula (I) are markedly effective.

According to the present invention, a satisfactory result can be obtained by adding the amounts described above. The proportions of various components are more specifically described below.

The proportion of group A [comprising one or more compounds selected from the compounds of the general formulae (Ia), (IIIa–c) and (IVa–c)] is in the range of 0 to 40 mol % and preferably 2 to 20 mol %.

The proportion of group B [comprising one or more compounds selected from the compounds of the general formulae (Ib–g), (IIa–f), (IIId–i) and (IVd–i) and (Va–f)] is in the range of 60 to 100 mole % and preferably 70 to 96 mol %.

Where group C [comprising one or more compounds selected from the compounds of the general formulae (VIa–h), (VIIa–l) and (VIIIa–f)] is added, the proportion thereof is preferably in the range of 2 to 15 mol %.

If the proportion of group A is excessively high, the response speed is increased to advantage, but the upper temperature limit of the nematic phase is lowered to narrow the liquid crystal range. Conversely, if it is excessively low, the response speed is decreased. If the proportion of group B is excessively high, the threshold voltage is lowered to advantage, but the response speed is decreased. Conversely, if it is excessively low, it is disadvantageous for the purpose of lowering the threshold voltage. Although a composition can be formed by using only groups A and B, group C may be added in order to extend the nematic phase to the higher temperature side. However, an excessively high proportion of group C is disadvantageous for the purpose of increasing the response speed, lowering the threshold voltage, and stabilizing the nematic phase at low temperatures.

In order to mix these components, desired amounts of minor components may be dissolved in major components by the application of heat. Alternatively, this may be done by dissolving various components in an organic solvent such as hexane, methanol or chloroform, mixing the resulting solutions, and then evaporating the organic solvent.

The liquid crystal compositions of the present invention, which can be prepared in the above-described manner, have a nematic liquid crystal phase over a wide temperature range extending from a lower limit of $-20°$ C. or below to an upper limit of $70°$–$100°$ C. They do not produce a smectic phase or a crystalline phase even after long-term storage at $-20°$ C.

Their threshold voltages are not higher than 2.0 V and often in the range of 1.0 to 1.6 V. As to the voltage holding ratio, they exhibit a value of 98% or greater even when measured at $100°$ C.

When used in liquid crystal display elements, the liquid crystal compositions of the present invention can further contain polychromatic dyes, such as azo dyes and anthraquinone dyes, to form a colored guest-host system. More specifically, dye-containing liquid crystal compositions prepared by adding, for example, a dichromatic dyes to a liquid crystal compositions in accordance with the present invention can be used in the phase transition guest-host mode.

Azo dyes and anthraquinone dyes are suitable for use as dichromatic dyes in the present invention. More specifically, the dichromatic dyes which can be added to the liquid crystal compositions of the present invention include azo dyes of the general formula

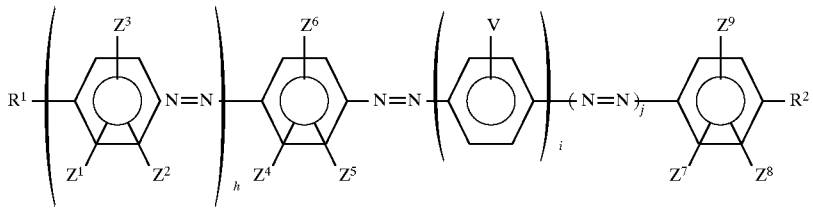

wherein $R^1$ and $R^2$ are each a substituted or unsubstituted alkyl group of 1 to 7 carbon atoms, or a dialkylamino group where each alkyl group is a substituted or unsubstituted alkyl group of 1 to 7 carbon atoms, the substituted alkyl group is an alkyl group substituted with a plurality of fluorine atoms or an alkyl group in which —$CH_2$— groups not adjacent to each other are substituted with O, S, NH, $SO_2$, OCO,

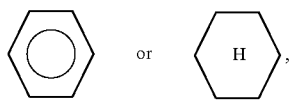

$Z^1$ to $Z^9$ are each hydrogen, methyl, methoxy or halogen, $Z^1$ and $Z^2$, $Z^4$ and $Z^5$, or $Z^7$ and $Z^8$ may be joined together to form an aliphatic ring, an aromatic ring or a nitrogen-containing aromatic ring, V is a fluoroalkyl group, h is 0, 1 or 2, i is 0, 1 or 2, and j is 0 or 1, provided that p is 0 when i is 0; and anthraquinone dyes of the general formula

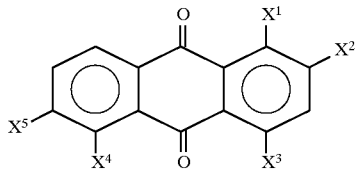

wherein $X^1$ to $X^5$ are each H, OH, halogen, CN, an unsubstituted or substituted amino group, an unsubstituted or substituted carboxylic acid ester group, an unsubstituted or substituted phenyloxy group, an unsubstituted or substituted benzyl group, an unsubstituted or substituted phenylthio group, an unsubstituted or substituted phenyl group, an unsubstituted or substituted cyclohexyloxycarbonyl group, or an unsubstituted or substituted pyridyl or pyrimidyl group. These dichromatic dyes are preferably added to the liquid crystal compositions in an amount of 0.2 to 3% by weight.

Furthermore, the liquid crystal compositions of the present invention can contain other additives including, for example, chiral dopants for imparting a desired twisting direction and strength thereto. The liquid crystal compositions containing such additives may be used in liquid crystal display elements by sandwiching them between transparent substrates on which active elements (such as TFTs or TFDs) or simple matrix electrodes are formed. These display elements may have various undercoats, orientation-controlling overcoats, polarizing plates, filters, reflective layers and the like as required. Moreover, these display elements may be constructed in various ways, for example, by forming them into multilayer cells, combining them with other display elements, using semiconductor substrates, or using light sources.

The present invention is further illustrated by the following examples.

Liquid crystal compositions in accordance with the present invention were prepared by weighing out predetermined amounts of various components, mixing them, and heating the resulting mixture until a solution in an isotropic state was obtained.

In the "composition of mixture" described in these examples, all percentages are mole percentages.

Properties of the liquid crystal compositions thus obtained were measured. The definitions of the symbols given in the examples and the measuring conditions therefor are as follows.

$T_{NI}$: Nematic-isotropic transition temperature (° C.).

Δn: Refractive index anisotropy.

This designates the difference between the extraordinary index ($n_e$) and ordinary index ($n_o$) which were measured with an Abbe refractometer by placing a sample on a homeotropically oriented prism. The measuring temperature was 25° C. and the measuring wavelength was 589.3 nm.

η: Bulk viscosity.

This was measured with an E rotational viscometer of the cone-and-plate type. The measuring temperature was 25° C.

Δε: Dielectric constant anisotropy.

This was calculated from the measured results of the voltage-capacity relationship of a packed cell in a homogeneously oriented state.

VHR: Voltage holding ratio.

This designates the holding ratio of an interelectrode voltage waveform which was measured under the following conditions.

Cell electrode area: 1 $cm^2$.

Cell gap: 5 μm (TN cell).

Oriented film: Polyimide AL-1051 (manufactured by Japan Synthetic Rubber Co., Ltd.).

Measuring frequency: 30 Hz square wave.

Measuring temperature: 100° C.

Pulse width: 60 μsec (±5 V TTL).

EXAMPLE 1

| (Composition of mixture) | |
|---|---|
| 4-n-Butyl-4'-n-propyltolan | 7.9% |
| 4-n-Pentyl-4'-ethyltolan | 7.9% |
| 4-n-Butyl-4'-ethoxytolan | 15.8% |
| 4-(trans-4-n-Propyl-4-silacyclohexyl)-3'-(fluoro-4'-difluoromethoxybiphenyl | 30.5% |
| 4-trans-4-n-Pentyl-4-silacyclohexyl)-3'-fluoro-4'-difluoromethoxybiphenyl | 37.9% |

EXAMPLE 2

(Composition of mixture)

| | |
|---|---|
| 4-n-Pentyl-4'-trifluoromethoxytolan | 10.0% |
| 2-Fluoro-4-n-Pentyl-4'-trifluoromethoxytolan | 10.0% |
| 4-(trans-4-n-Propyl-4-silacyclohexyl)-3'-5'-difluoro-4'-(2,2-difluoroethoxy)biphenyl | 56.5% |
| 4-(trans-4-n-Pentyl-4-silacyclohexyl)-3,5'-difluoro-4'-(2,2-difluoroethoxy)biphenyl | 23.5% |

(Properties)

$T_{NI}$ = 72.6° C., $\Delta n$ = 0.160, $\eta$ = 19.7 cP, $\Delta\epsilon$ = 12.3, VHR = 99.0%.

EXAMPLE 3

(Composition of mixture)

| | |
|---|---|
| 4-n-Butyl-4'-n-propyltolan | 4.6% |
| 4-n-Pentyl-4'-ethyltolan | 4.6% |
| 4-n-Butyl-4'-ethoxytolan | 9.3% |
| 4-(trans-4-n-Propyl-4-silacyclohexyl)-3',4',5'-trifluorotolan | 22.2% |
| 4-(trans-4-n-Pentyl-4-silacyclohexyl)-3',4',5'-trifluorotolan | 21.0% |
| 4-(2-(trans-4-n-propylcyclohexyl)ethyl)-3-fluoro-4'-trifluoromethoxytolan | 38.3% |

(Properties)

$T_{NI}$ = 91.1° C., $\Delta n$ = 0.199, $\eta$ = 21.0 cP, $\Delta\epsilon$ = 8.7, VHR = 99.0%.

EXAMPLE 4

(Composition of mixture)

| | |
|---|---|
| 4-n-Butyl-4'-n-propyltolan | 5.5% |
| 4-n-Pentyl-4'-ethyltolan | 5.5% |
| 4-n-Butyl-4'-ethoxytolan | 11.1% |
| 4-(trans-4-n-Propylcyclohexyl)-3',5'-difluoro-4'-(2,2-difluorovinyloxy)biphenyl | 6.2% |
| 4-(trans-4-n-Pentylcyclohexyl)-3',5'-difluoro-4'-(2,2-difluorovinyloxy)biphenyl | 6.1% |
| 4-(trans-4-n-Propyl-4-silacyclohexyl)-3',4'-difluorotolan | 30.8% |
| 4-(trans-4-n-Pentyl-4-silacyclohexyl)-3',4'-difluorotolan | 34.8% |

(Properties)

$T_{NI}$ = 95.0° C., $\Delta n$ = 0.198, $\eta$ = 21.1 cP, $\Delta\epsilon$ = 5.9, VHR = 99.2%.

EXAMPLE 5

(Composition of mixture)

| | |
|---|---|
| 4-n-Hexyl-4'-n-butyltolan | 9.5% |
| 4-n-Pentyl-4'-n-pentyltolan | 7.0% |
| 4-n-Butyl-4'-ethoxytolan | 5.5% |
| 4-(trans-4-n-Propyl-4-silacyclohexyl)-3'-fluoro-4'-difluoromethoxybiphenyl | 17.8% |
| 4-(trans-4-n-Pentyl-4-silacyclohexyl)-3'-fluoro-4'-difluoromethoxybiphenyl | 22.2% |
| 4-(trans-4-n-Propyl-4-silacyclohexyl)-2,6-difluoro-4'-trifluoromethoxybiphenyl | 1.7% |
| 4-(trans-4-n-Butyl-4-silacyclohexyl)-2,6-difluoro-4-trifluoromethoxybiphenyl | 1.7% |
| 4-(trans-4-n-Pentyl-4-silacyclohexyl)-2,6-difluoro-4'-trifluoromethoxybiphenyl | 1.7% |
| 4-[trans-4-(trans-4-n-Propyl-4-silacyclohexyl)-cyclohexyl]-1,2,6-trifluorobenzene | 6.3% |
| 4-[trans-4-(trans-4-n-Pentyl-4-silacyclohexyl)-cyclohexyl]-1,2,6-trifluorobenzene | 3.4% |
| 4-[trans-4-(trans-4-n-Propyl-4-silacyclohexyl)-cyclohexyl]-3',4',5'-trifluorobiphenyl | 12.8% |
| 4-[trans-4-(trans-4-n-Pentyl-4-silacyclohexyl)-cyclohexyl]-3',4',5'-trifluorobiphenyl | 10.4% |

(Properties)

$T_{NI}$ = 99.5° C., $\Delta n$ = 0.156, $\eta$ = 27.3 cP, $\Delta\epsilon$ = 7.7, VHR = 99.2%.

EXAMPLE 6

(Composition of mixture)

| | |
|---|---|
| 4-(trans-4-n-Pentyl-4-silacyclohexyl)-1-methoxybenzene | 7.0% |
| 4-n-Butyl-4'-n-propyltolan | 3.8% |
| 4-n-Pentyl-4'-ethyltolan | 3.7% |
| 4-n-Butyl-4'-ethoxytolan | 7.5% |
| 4-(trans-4-n-Propyl-4-silacyclohexyl)-2-fluoro-4'-trifluoromethoxybiphenyl | 12.4% |
| 4-(trans-4-n-Pentyl-4-silacyclohexyl)-2-fluoro-4'-trifluoromethoxybiphenyl | 22.6% |
| 4-(trans-4-n-Propyl-4-silacyclohexyl)-2,3',4',5'-tetrafluorobiphenyl | 4.2% |
| 4-(trans-4-n-Pentyl-4-silacyclohexyl)-2,3',4',5'-tetrafluorobiphenyl | 3.8% |
| 4-[trans-4-(trans-4-n-Propylcyclohexyl)-4-silacyclohexyl]-1,2-difluorobenzene | 11.4% |
| 4-[trans-4-(trans-4-n-Pentylcyclohexyl)-4-silacyclohexyl]-1,2-difluorobenzene | 3.6% |
| 4-[trans-4-(trans-4-n-Propyl-4-silacyclohexyl)-cyclohexyl]-3',4',5'-trifluorobiphenyl | 11.0% |
| 4-[trans-4-(trans-4-n-Pentyl-4-silacyclohexyl)-cyclohexyl]-3',4',5'-trifluorobiphenyl | 9.0% |

(Properties)

$T_{NI}$ = 86.5° C., $\Delta n$ = 0.138, $\eta$ = 24.1 cP, $\Delta\epsilon$ = 7.5, VHR = 99.0%.

EXAMPLE 7

(Composition of mixture)

| | |
|---|---|
| 4-n-Hexyl-4'-n-butyltolan | 5.4% |
| 4-n-Butyl-4'-ethoxytolan | 4.5% |
| 4-(trans-4-n-Propyl-4-silacyclohexyl)-2-fluoro-4'-trifluoromethoxybiphenyl | 12.6% |
| 4-(trans-4-n-Pentyl-4-silacyclohexyl)-2-fluoro-4'-trifluoromethoxybiphenyl | 23.0% |
| 4-(trans-4-n-Propyl-4-silacyclohexyl)-2,3',4',5'-tetrafluorobiphenyl | 2.9% |
| 4-(trans-4-n-Pentyl-4-silacyclohexyl)-2,3',4',5'-tetrafluorobiphenyl | 2.7% |
| 4-(trans-4-n-Propyl-4-silacyclohexyl)-3',4'-difluorotolan | 16.7% |
| 4-(trans-4-n-Pentyl-4-silacyclohexyl)-3',4'-difluorotolan | 18.9% |
| 4-(trans-4-n-Propyl-4-silacyclohexyl)-3',4',5'-trifluorotolan | 6.9% |
| 4-(trans-4-n-Pentyl-4-silacyclohexyl)-3',4',5'- | 6.4% |

-continued trifluorotolan
(Properties)

$T_{NI}$ = 75.5° C., $\Delta n$ = 0.166, $\eta$ = 22.6 cP, $\Delta \epsilon$ = 7.5, VHR = 99.0%.

EXAMPLE 8

(Composition of mixture)

| | |
|---|---|
| 4-n-Pentyl-2-fluoro-4'-fluorotolan | 10.0% |
| 4-n-Pentyl-2-fluoro-4'-trifluoromethoxytolan | 10.0% |
| 4-(trans-4-n-Propyl-4-silacyclohexyl)-3',5'-difluoro-4'-(2,2-difluoroethoxy)biphenyl | 29.0% |
| 4-(trans-4-n-Pentyl-4-silacyclohexyl)-3',5'-difluoro-4'-(2,2-difluoroethoxy)biphenyl | 12.0% |
| 4-[trans-4-(trans-4-n-Propyl-4-silacyclohexyl)-cyclohexyl]-2-fluoro-1-trifluoromethoxy-benzene | 9.9% |
| 4-[trans-4-(trans-4-n-Pentyl-4-silacyclohexyl)-cyclohexyl]-2-fluoro-1-trifluoromethoxy-benzene | 20.1% |
| trans,trans-2'-Fluoro-4-(4-n-propyl-4-silacyclohexyl)-4'-(4-n-propylcyclohexyl)-biphenyl | 3.0% |
| trans,trans-2'-Fluoro-4-(4-n-pentyl-4-silacyclohexyl)-4'-(4-n-propylcyclohexyl)-biphenyl | 3.0% |
| trans,trans-2'-Fluoro-4-(4-n-pentyl-4-silacyclohexyl)-4'-(4-n-pentylcyclohexyl)-biphenyl | 3.0% |

(Properties)

$T_{NI}$ = 82.8° C., $\Delta n$ = 0.138, $\eta$ = 24.0 cP, $\Delta \epsilon$ = 8.8, VHR = 99.0%.

EXAMPLE 9

(Composition of mixture)

| | |
|---|---|
| 4-n-Butyl-4'-n-propyltolan | 7.9% |
| 4-n-Pentyl-4'-ethyltolan | 7.9% |
| 4-n-Butyl-4'-ethoxytolan | 15.8% |
| 4-(trans-4-n-Propylcyclohexyl)-2,6,3',5'-tetrafluoro-4'-(2,2-difluoroethoxy)biphenyl | 3.5% |
| 4-(trans-4-n-Butylcyclohexyl)-2,6,3',5'-tetrafluoro-4'-(2,2-difluoroethoxy)biphenyl | 3.5% |
| 4-(trans-4-n-Pentylcyclohexyl)-2,6,3',5'-tetrafluoro-4'-(2,2-difluoroethoxy)biphenyl | 3.5% |
| 4-(trans-4-n-Propyl-4-silacyclohexyl)-3',4',5'-trifluorotolan | 8.1% |
| 4-(trans-4-n-Pentyl-4-silacyclohexyl)-3',4',5'-trifluorotolan | 7.7% |
| 4-(trans-4-n-Propyl-4-silacyclohexyl)-3',4'-difluorotolan | 8.8% |
| 4-(trans-4-n-Butyl-4-silacyclohexyl)-3',4'-difluorotolan | 8.8% |
| 4-(trans-4-n-Pentyl-4-silacyclohexyl)-3',4'-difluorotolan | 8.8% |
| 4-[trans-4-(trans-4-n-Propylcyclohexyl)cyclohexyl]-2-fluoro-1-trifluoromethoxybenzene | 5.3% |
| 4-[trans-4-(trans-4-n-Pentylcyclohexyl)cyclohexyl]-2-fluoro-1-trifluoromethoxybenzene | 5.3% |
| trans,trans-2-Fluoro-4-(4-n-propylcyclohexyl)-4'-(4-n-propylcyclohexyl)biphenyl | 1.7% |
| trans,trans-2-Fluoro-4-(4-n-pentylcyclohexyl)-4'-(4-n-propylcyclohexyl)biphenyl | 1.7% |
| trans,trans-2-Fluoro-4-(4-n-pentylcyclohexyl)-4'-(4-n-pentylcyclohexyl)biphenyl | 1.7% |

(Properties)

$T_{NI}$ = 91.4° C., $\Delta n$ = 0.183, $\eta$ = 24.5 cP, $\Delta \epsilon$ = 5.8, VHR = 99.0%.

EXAMPLE 10

(Composition of mixture)

| | |
|---|---|
| 4-n-Butyl-4'-n-propyltolan | 6.3% |
| 4-n-Pentyl-4'-ethyltolan | 6.2% |
| 4-n-Butyl-4'-ethoxytolan | 12.5% |
| 4-(trans-4-n-Propyl-4-silacyclohexyl)-2,3',4',5'-tetrafluorobiphenyl | 5.3% |
| 4-(trans-4-n-Pentyl-4-silacyclohexyl)-2,3',4',5'-tetrafluorobiphenyl | 4.7% |
| 4-(trans-4-n-Propyl-4-silacyclohexyl)-3',4'-difluorotolan | 10.0% |
| 4-(trans-4-n-Pentyl-4-silacyclohexyl)-3',4'-difluorotolan | 10.0% |
| 4-[2-(trans-4-n-Propylcyclohexyl)ethyl]-2,3',4'-trifluorotolan | 15.0% |
| 4-[2-(trans-4-n-Pentylcyclohexyl)ethyl]-2,3',4'-trifluorotolan | 15.0% |
| 4-(trans-4-n-Propyl-4-silacyclohexyl)-2-fluoro-4'-[2-(3,4-difluorophenyl)ethyl]biphenyl | 7.5% |
| 4-(trans-4-n-Pentyl-4-silacyclohexyl)-2-fluoro-4'-[2-(3,4-difluorophenyl)ethyl]biphenyl | 7.5% |

(Properties)

$T_{NI}$ = 90.8° C., $\Delta n$ = 0.198, $\eta$ = 22.5 cP, $\Delta \epsilon$ = 6.0, VHR = 99.2%.

EXAMPLE 11

(Composition of mixture)

| | |
|---|---|
| 4-n-Pentyl-2-fluoro-4'-fluorotolan | 5.0% |
| 4-n-Pentyl-2-fluoro-4'-trifluoromethoxytolan | 8.0% |
| 4-[trans-4-(3-Methoxy-n-propyl)-4-silacyclohexyl]-3',4'-difluorobiphenyl | 10.0% |
| 4-(trans-4-n-Propyl-4-silacyclohexyl)-3',5'-difluoro-4'-difluoromethoxybiphenyl | 8.0% |
| 4-(trans-4-n-Butyl-4-silacyclohexyl)-3',5'-difluoro-4'-difluoromethoxybiphenyl | 7.0% |
| 4-(trans-4-n-Pentyl-4-silacyclohexyl)-3',5'-difluoro-4'-difluoromethoxybiphenyl | 7.0% |
| 4-(trans-4-n-Propyl-4-silacyclohexyl)-3',4'-difluorotolan | 20.0% |
| 4-(trans-4-n-Pentyl-4-silacyclohexyl)-3',4'-difluorotolan | 20.0% |
| 4-trans-4-(trans-4-Vinylcyclohexyl)-cyclohexyl]-1,2-difluorobenzene | 7.5% |
| 4-{trans-4-[trans-4-(3-n-Butenyl)cyclohexyl]-cyclohexyl}-1,2-difluorobenzene | 7.5% |

(Properties)

$T_{NI}$ = 83.4° C., $\Delta n$ = 0.161, $\eta$ = 21.2 cP, $\Delta \epsilon$ = 6.8, VHR = 99.2%.

EXAMPLE 12

(Composition of mixture)

| | |
|---|---|
| 4-n-Butyl-4'-n-propyltolan | 3.5% |
| 4-n-Pentyl-4'-ethyltolan | 3.5% |
| 4-n-Butyl-4'-ethoxytolan | 7.0% |
| 4-[2-(trans-4-n-Propyl-4-silacyclohexyl)ethyl]-3',4'-difluorotolan | 21.3% |
| 4-[2-(trans-4-n-Pentyl-4-silacyclohexyl)ethyl]-3',4'-difluorotolan | 21.3% |
| 4-[2-(trans-4-n-Propylcyclohexyl)ethyl]-2,3',4'-trifluorobiphenyl | 4.3% |
| 4-[2-(trans-4-n-Pentylcyclohexyl)ethyl]-2,3',4'-trifluorobiphenyl | 4.3% |
| trans-4-{trans-4-[2-(3,4-Difluorophenyl)ethyl]-cyclohexyl}-1-n-propylcyclohexane | 11.6% |
| trans-4-{trans-4-[2-(3,4-Difluorophenyl)ethyl]- | 11.6% |

| | |
|---|---|
| cyclohexyl}-1-n-butylcyclohexane | |
| trans-4-{trans-4-[2-(3,4-Difluorophenyl)ethyl] cyclohexyl}-1-n-pentylcyclohexane | 11.6% |
| (Properties) | |

$T_{NI}$ = 70.3° C., $\Delta n$ = 0.146, $\eta$ = 24.0 cP, $\Delta \epsilon$ = 6.3, VHR = 99.2%.

We claim:

1. A liquid crystal composition comprising one or more compounds wherein at least one of said compounds contains a trans-1-sila-1,4-cyclohexylene or trans-4-sila-1,4-cyclohexylene group, and at least one of said compounds is of the general formula (I)

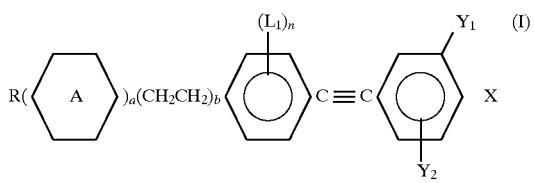

wherein
R is an alkyl group of 1 to 7 carbon atoms, an alkoxyalkyl group of 2 to 7 carbon atoms, a mono- or difluoroalkyl group of 2 to 7 carbons, or an alkenyl group of 2 to 7 carbons,
a and b are each 0 or 1,

is a trans-1-sila-1,4-cyclohexylene, trans-4-sila-1,4-cyclohexylene or trans-1,4-cyclohexylene group,
X is H, F, Cl, $OCHF_2$, $OCF_3$, $CF_3$, $(O)_sC_pH_qF_r$ wherein s is 0 or 1, p is 2, 3 or 4, and (q+r)=(2p+1), $(O)_sCY=CX_1X_2$
wherein $X_1$ and Y are each H, F or Cl, and $X_2$ is F or Cl, an alkyl group of 5 or less carbon atoms, or an alkoxy group of 5 or less carbon atoms,
$Y_1$ and $Y_2$ are each H or F,
$L_1$ is F, and
n is 0, 1 or 2.

2. A liquid crystal composition comprising one or more compounds of the general formula (I) and one or more compounds having a silacyclohexane ring

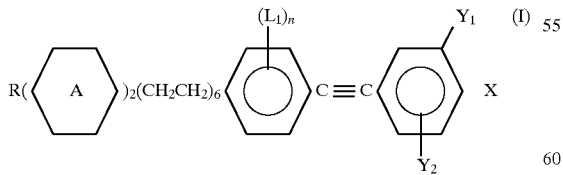

wherein
R is an alkyl group of 1 to 7 carbon atoms, an alkoxyalkyl group of 2 to 7 carbon atoms, a mono- or difluoroalkyl group of 2 to 7 carbons, or an alkenyl group of 2 to 7 carbons,
a and b are each 0 or 1,

is a trans-1-sila-1,4-cyclohexylene, trans-4-sila-1,4-cyclohexylene or trans-1,4-cyclohexylene group,
X is H, F, Cl, $OCHF_2$, $OCF_3$, $CF_3$, $(O)_sC_pH_qF_r$, wherein s is 0 or 1, p is 2, 3 or 4, and (q+r)=(2p+1), $(O)_sCY=CX_1X_2$ wherein $X_1$ and Y are each H, F or Cl, and $X_2$ is F or Cl, an alkyl group of 5 or less carbon atoms, or an alkoxy group of 5 or less carbon atoms,
$Y_1$ and $Y_2$ are each H or F,
$L_1$ is F, and
n is 0, 1 or 2.

3. A liquid crystal composition according to claim 2 wherein said one or more compounds of the general formula (I) is of the general formula (1a), (1d) or (1g)

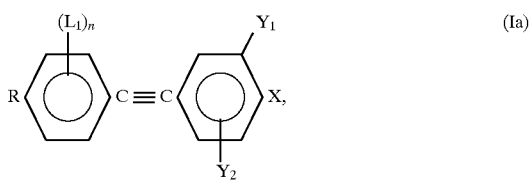

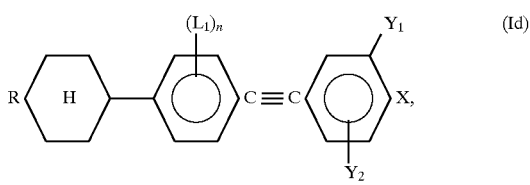

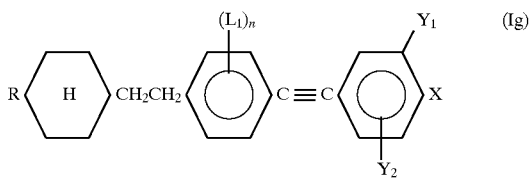

wherein R, X, $Y_1$, $Y_2$, $L_1$, n are as defined for the general formula (I).

4. A liquid crystal composition as according to claim 3 wherein said one or more compounds having a silacyclohexane ring is one or more compounds of the general formula (IIa), (IIb), (IId) or (IIe)

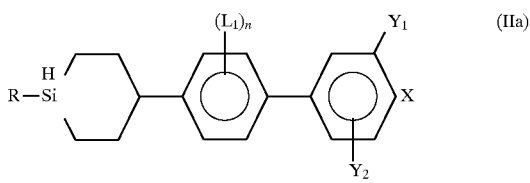

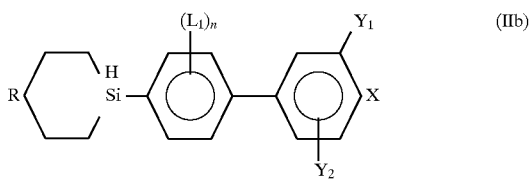

-continued

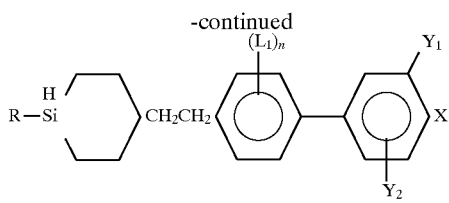 (IId)

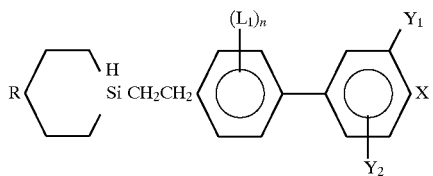 (IIe)

wherein R, X, Y$_1$, Y$_2$, L$_1$, n are as defined for the general formula (I).

5. A liquid crystal composition comprising one or more compounds of the general formula (Ia), (Id), or (Ig),

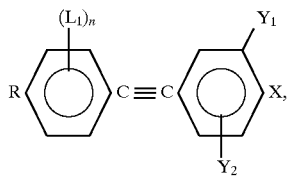 (Ia)

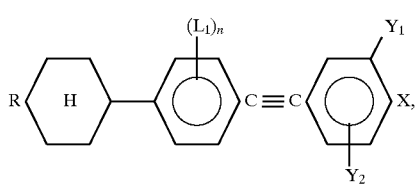 (Id)

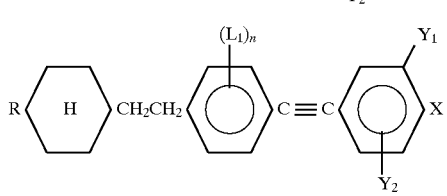 (Ig)

and one or more compounds of the general formula (Ib), (Ic), (Ie), or (If),

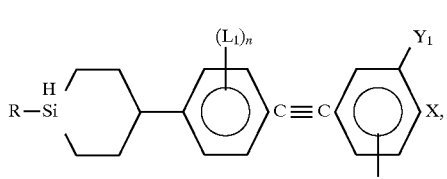 (Ib)

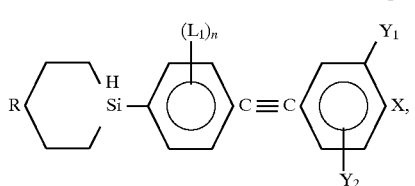 (Ic)

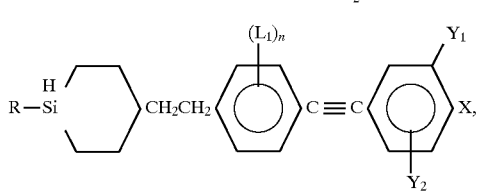 (Ie)

-continued

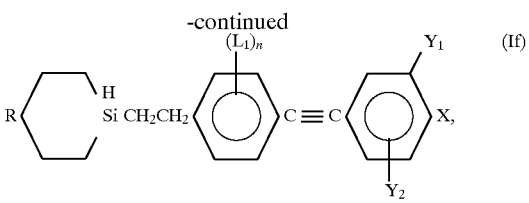 (If)

wherein
R is an alkyl group of 1 to 7 carbon atoms, an alkoxyalkyl group of 2 to 7 carbon atoms, a mono- or difluoroalkyl group of 2 to 7 carbons, or an alkenyl group of 2 to 7 carbons,
a and b are each 0 or 1,

is a trans-1-sila-1,4-cyclohexylene, trans-4-sila-1,4-cyclohexylene or trans-1,4-cyclohexylene group,
X is H, F, Cl, OCHF$_2$, OCF$_3$, CF$_3$, (O)$_s$C$_p$H$_q$F$_r$, wherein s is 0 or 1, p is 2, 3 or 4, and (q+r)=(2p+1), (O)$_s$CY=CX$_1$X$_2$ wherein X$_1$ and Y are each H, F or Cl, and X$_2$ is F or Cl, an alkyl group of 5 or less carbon atoms, or an alkoxy group of 5 or less carbon atoms,
Y$_1$ and Y$_2$ are each H or F,
L$_1$ is F, and
n is 0, 1 or 2.

6. A liquid crystal composition according to claim 5, wherein said one or more compounds of the general formula (Ib), (Ic), (Ie), or (If) is of the general formula (Ib).

7. A liquid crystal composition according to claim 5, wherein said one or more compounds of the general formula (Ib), (Ic), (Ie), or (If) is of the general formula (Ie).

8. A liquid crystal composition according to claim 5 further comprising one or more compounds of the general formula (II)

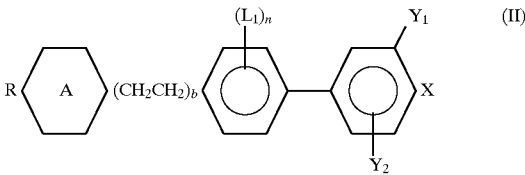 (II)

wherein
R is an alkyl group of 1 to 7 carbon atoms, an alkoxyalkyl group of 2 to 7 carbon atoms, a mono- or difluoroalkyl group of 2 to 7 carbon atoms, or an alkenyl group of 2 to 7 atoms,
b is 0 or 1,

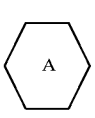

is a trans-1-sila-1,4-cyclohexylene, trans-4-sila-1,4-cyclohexylene or trans-1,4-cyclohexylene group,
X is H, F, Cl, OCHF$_2$, OCF$_3$, (O)$_s$C$_p$H$_q$F$_r$, wherein s is 0 or 1, p is 2, 3 or 4, and (q+r)=(2p+1), (O)$_s$CY=CX$_1$X$_2$ wherein X$_1$ and Y are each H, F or Cl, and X$_2$ is F or Cl, an alkyl group of 5 or less carbon atoms, or an alkoxy group of 5 or less carbon atoms, $Y_1$ and $Y_2$ are each H or F, $L_1$ is F, and n is 0, 1 or 2.

9. A liquid crystal composition according to claim 6 further comprising one or more compounds of the general formula (II)

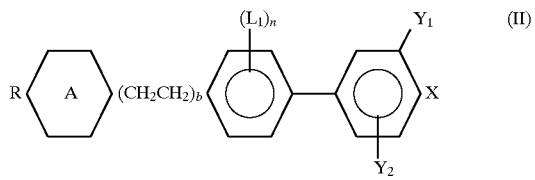

wherein

R is an alkyl group of 1 to 7 carbon atoms, an alkoxyalkyl group of 2 to 7 carbon atoms, a mono- or difluoroalkyl group of 2 to 7 carbon atoms, or an alkenyl group of 2 to 7 atoms, b is 0 or 1,

is a trans-1-sila-1,4-cyclohexylene, trans-4-sila-1,4-cyclohexylene or trans-1,4-cyclohexylene group, X is H, F, Cl, $OCHF_2$, $OCF_3$, $(O)_sC_pH_qF_r$ wherein s is 0 or 1, p is 2, 3 or 4, and (q+r)=(2p+1), $(O)_sCY=CX_1X_2$ wherein $X_1$ and Y are each H, F or Cl, and $X_2$ is F or Cl, an alkyl group of 5 or less carbon atoms, or an alkoxy group of 5 or less carbon atoms, $Y_1$ and $Y_2$ are each H or F, $L_1$ is F, and n is 0, 1 or 2.

10. A liquid crystal composition according to claim 7 further comprising one or more compounds of the general formula (II)

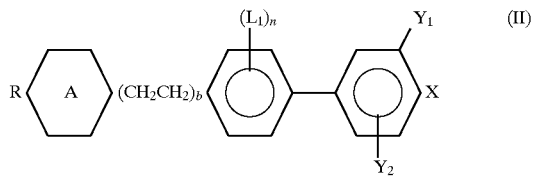

wherein

R is an alkyl group of 1 to 7 carbon atoms, an alkoxyalkyl group of 2 to 7 carbon atoms, a mono- or difluoroalkyl group of 2 to 7 carbon atoms, or an alkenyl group of 2 to 7 atoms, b is 0 or 1,

is a trans-1-sila-1,4-cyclohexylene, trans-4-sila-1,4-cyclohexylene or trans-1,4-cyclohexylene group, X is H, F, Cl, $OCHF_2$, $OCF_3$, $(O)_sC_pH_qF_r$ wherein s is 0 or 1, p is 2, 3 or 4, and (q+r)=(2p+1), $(O)_sCY=CX_1X_2$ wherein $X_1$ and Y are each H, F or Cl, and $X_2$ is F or Cl, an alkyl group of 5 or less carbon atoms, or an alkoxy group of 5 or less carbon atoms, $Y_1$ and $Y_2$ are each H or F, $L_1$ is F, and n is 0, 1 or 2.

11. A liquid crystal composition comprising at least one compound of general formula (I)

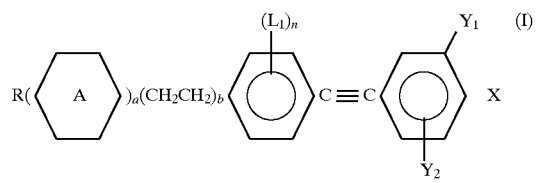

and at least one compound of the general formula (II)

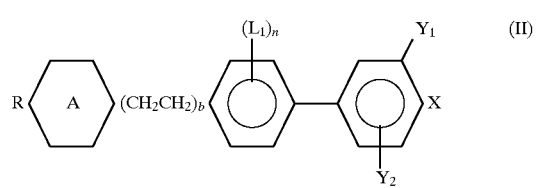

wherein

R is an alkyl group of 1 to 7 carbon atoms, an alkoxyalkyl group of 2 to 7 carbon atoms, a mono- or difluoroalkyl group of 2 to 7 carbon atoms, or an alkenyl group of 2 to 7 atoms, b is 0 or 1,

is a trans-1-sila-1,4-cyclohexylene, trans-4-sila-1,4-cyclohexylene or trans-1,4-cyclohexylene group, X is H, F, Cl, $OCHF_2$, $OCF_3$, $(O)_sC_pH_qF_r$ wherein s is 0 or 1, p is 2, 3 or 4, and (q+r)=(2p+1), $(O)_sCY=CX_1X_2$ wherein $X_1$ and Y are each H, F or Cl, and $X_2$ is F or Cl, an alkyl group of 5 or less carbon atoms, or an alkoxy group of 5 or less carbon atoms, $Y_1$ and $Y_2$ are each H or F, $L_1$ is F, and n is 0, 1 or 2, while at least one compound of said liquid crystal composition has a trans-1-sila-1,4-cyclohexylene or trans-4-sila-1,4-cyclohexylene group.

12. A liquid crystal composition comprising one or more compounds of the general formula (I)

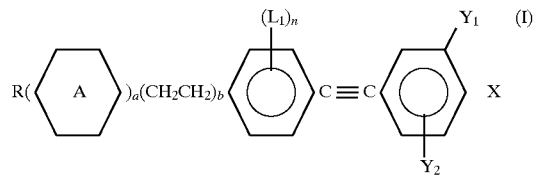

and one or more compounds of the general formula (III), (IV) or (V)

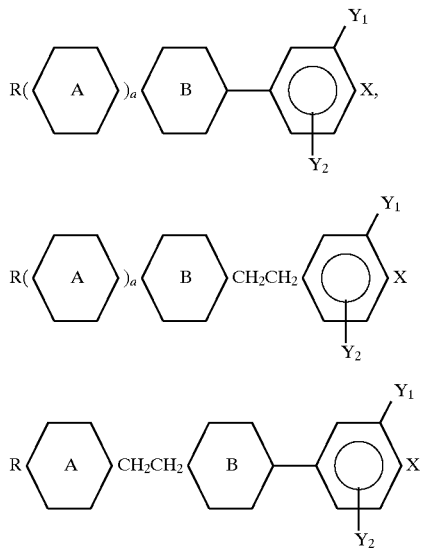 (III)

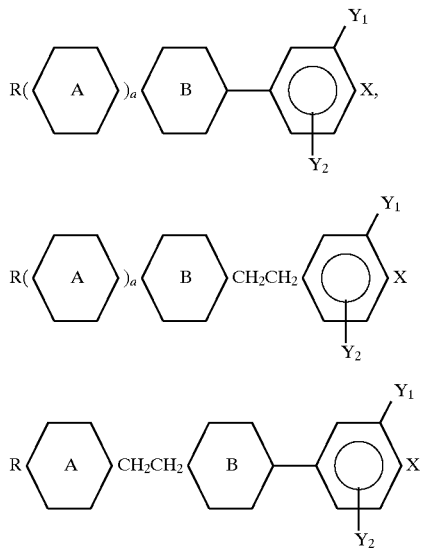 (IV)

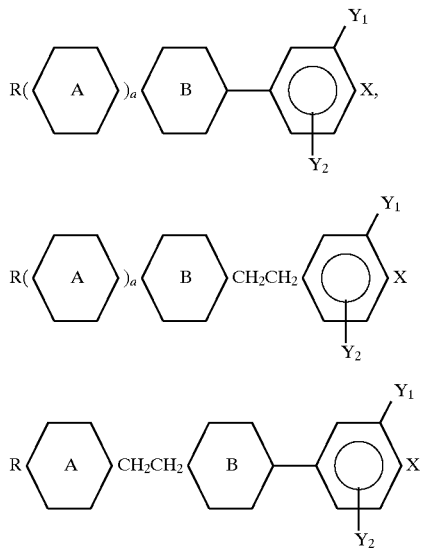 (V)

wherein

R is an alkyl group of 1 to 7 carbon atoms, an alkoxyalkyl group of 2 to 7 carbon atoms, a mono- or difluoroalkyl group of 2 to 7 carbon atoms, or an alkenyl group of 2 to 7 atoms, a is 0 or 1,

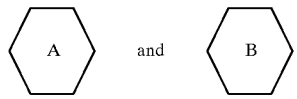

are each a trans-1-sila-1,4-cyclohexylene, trans-4-sila-1,4-cyclohexylene or trans-1,4-cyclohexylene group, X is H, F, Cl, $OCHF_2$, $OCF_3$, $(O)_s C_p H_q F_r$ wherein s is 0 or 1, p is 2, 3 or 4, and $(q+r)=(2p+1)$, $(O)_s CY=CX_1 X_2$ wherein $X_1$ and Y are each H, F or Cl, and $X_2$ is F or Cl, an alkyl group of 5 or less carbon atoms, or an alkoxy group of 5 or less carbon atoms, and $Y_1$ and $Y_2$ are each H or F, while at least one compound of said liquid crystal composition has a trans-1-sila-1,4-cyclohexylene or trans-4-sila-1,4-cyclohexylene group.

13. A liquid crystal composition according to claim 12 wherein said one or more compounds of the general formula (III), (IV), or (V) is of the general formula of (III).

14. A liquid crystal composition comprising at least one compound of the above general formula (I)

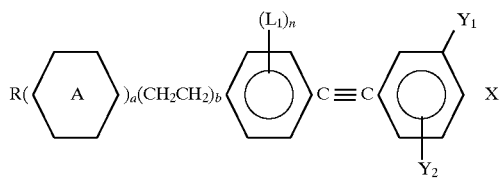 (I)

at least one compound of the formula (II),

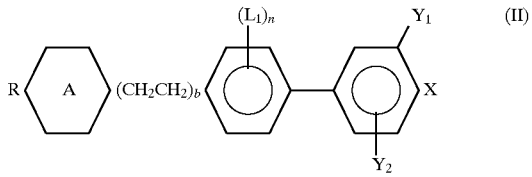 (II)

and at least one compound of the general formula (III), (IV), or (V),

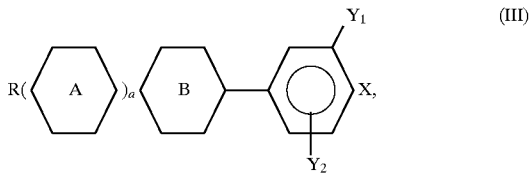 (III)

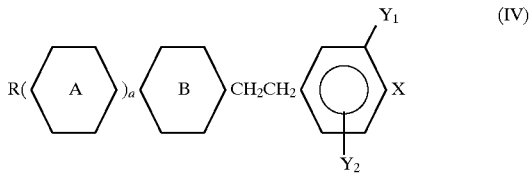 (IV)

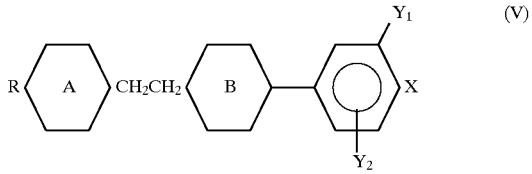 (V)

wherein

R is an alkyl group of 1 to 7 carbon atoms, an alkoxyalkyl group of 2 to 7 carbon atoms, a mono- or difluoroalkyl group of 2 to 7 carbon atoms, or an alkenyl group of 2 to 7 atoms, a is 0 or 1,

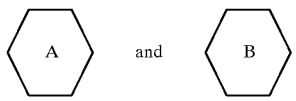

are each a trans-1-sila-1,4-cyclohexylene, trans-4-sila-1,4-cyclohexylene or trans-1,4-cyclohexylene group, X is H, F, Cl, $OCHF_2$, $OCF_3$, $(O)_s C_p H_q F_r$ wherein s is 0 or 1, p is 2, 3 or 4, and $(q+r)=(2p+1)$, $(O)_s CY=CX_1 X_2$ wherein $X_1$ and Y are each H, F or Cl, and $X_2$ is F or Cl, an alkyl group of 5 or less carbon atoms, or an alkoxy group of 5 or less carbon atoms, and $Y_1$ and $Y_2$ are each H or F, while at least one compound of said liquid crystal composition has a trans-1-sila-1,4-cyclohexylene or trans-4-sila-1,4-cyclohexylene group.

15. A liquid crystal composition according to claim 14 wherein said one or more compounds of the general formula (III), (IV), or (V) is of the general formula of (III).

16. A liquid crystal composition comprising at least one compound of formula (I)

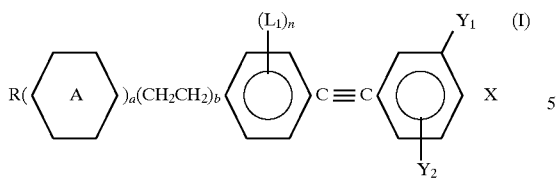

and at least one compound of the general formula (VI), (VII), or (VIII)

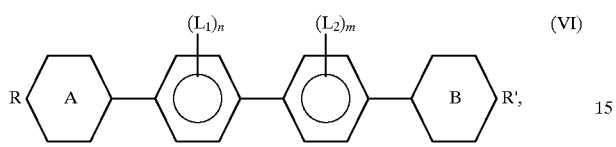

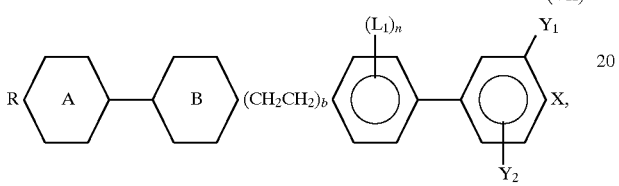

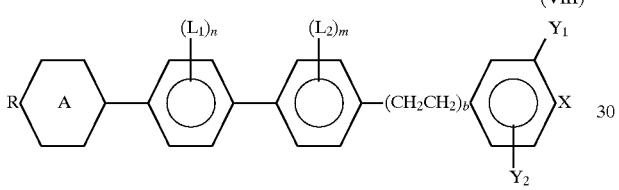

wherein

R and R' are each an alkyl group of 1 to 7 carbon atoms, an alkoxyalkyl group of 2 to 7 carbon atoms, a mono- or difluoroalkyl group of 2 to 7 carbon atoms, or an alkenyl group of 2 to 7 carbon atoms, b is 0 or 1,

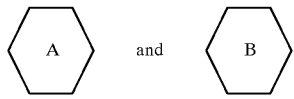

are each a trans-1-sila-1,4-cyclohexylene, trans-4-sila-1,4-cyclohexylene or trans-1,4-cyclohexylene group, X is H, F, Cl, $OCHF_2$, $OCF_3$, $(O)_sC_pH_qF_r$ wherein s is 0 or 1, p is 2, 3 or 4, and $(q+r)=(2p+1)$, $(O)_sCY=CX_1X_2$ wherein $X_1$ and Y are each H, F or Cl, and $X_2$ is F or Cl, an alkyl group of 5 or less carbon atoms, or an alkoxy group of 5 or less carbon atoms, and $Y_1$ and $Y_2$ are each H or F, $L_1$ and $L_2$ are each F, and m and n are each 0, 1 or 2, while at least one compound of said liquid crystal composition has trans-1-sila-1,4-cyclohexylene or trans-4-sila-1,4-cyclohexylene group.

17. A liquid crystal composition according to claim 16 wherein said one or more compounds of the general formula (VI), (VII), or (VIII) is of the general formula (VI).

18. A liquid crystal composition according to claim 16 wherein said one or more compounds of the general formula (VI), (VII), or (VIII) is of the general formula (VII).

19. A liquid crystal display element containing a Liquid crystal composition as claimed in any one of claims 1–16.

20. A liquid crystal composition comprising at least one compound of general formula (I)

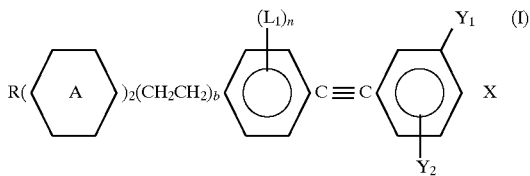

wherein

R is an alkyl group of 1 to 7 carbon atoms, an alkoxyalkyl group of 2 to 7 carbon atoms, a mono- or difluoroalkyl group of 2 to 7 carbons, or an alkenyl group of 2 to 7 carbons, a and b are each 0 or 1,

is a trans-1-sila-1,4-cyclohexylene, trans-4-sila-1,4-cyclohexylene or trans-1,4-cyclohexylene group, X is H, F, Cl, $OCHF_2$, $OCF_3$, $CF_3$, $(O)_sC_pH_qF_r$, wherein s is 0 or 1, p is 2, 3 or 4, and $(q+r)=(2p+1)$, $(O)_sCY=CX_1X_2$ wherein $X_1$ and Y are each H, F or Cl, and $X_2$ is F or Cl, an alkyl group of 5 or less carbon atoms, or an alkoxy group of 5 or less carbon atoms, $Y_1$ and $Y_2$ are each H or F, $L_1$ is F, and n is 0, 1 or 2;

at least one compound of general formula (II),

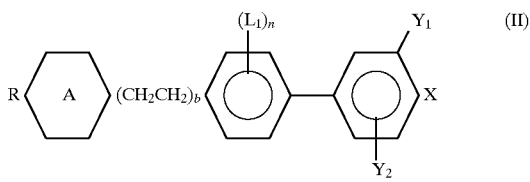

wherein

R is an alkyl group of 1 to 7 carbon atoms, an alkoxyalkyl group of 2 to 7 carbon atoms, a mono- or difluoroalkyl group of 2 to 7 carbon atoms, or an alkenyl group of 2 to 7 atoms, b is 0 or 1,

is a trans-1-sila-1,4-cyclohexylene, trans-4-sila-1,4-cyclohexylene or trans-1,4-cyclohexylene group, X is H, F, Cl, $OCHF_2$, $OCF_3$, $(O)_sC_pH_qF_r$ wherein s is 0 or 1, p is 2, 3 or 4, and $(q+r)=(2p+1)$, $(O)_sCY=CX_1X_2$ wherein $X_1$ and Y are each H, F or Cl, and $X_2$ is F or Cl, an alkyl group of 5 or less carbon atoms, or an alkoxy group of 5 or less carbon atoms, $Y_1$ and $Y_2$ are each H or F, $L_1$ is F, and n is 0, 1 or 2;

and at least one compound of formula (VI), (VII) or (VIII),

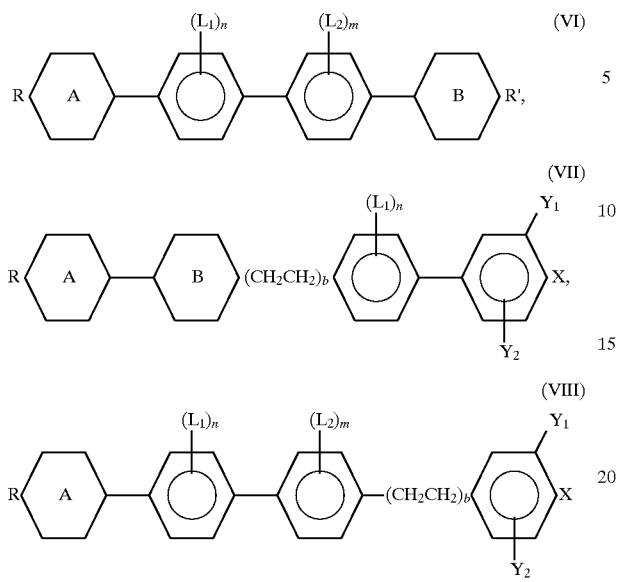

wherein
R and R' are each an alkyl group of 1 to 7 carbon atoms, an alkoxyalkyl group of 2 to 7 carbon atoms, a mono- or difluoroalkyl group of 2 to 7 carbon atoms, or an alkenyl group of 2 to 7 carbon atoms,
b is 0 or 1,

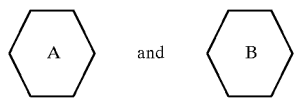

are each a trans-1-sila-1,4-cyclohexylene, trans-4-sila-1,4-cyclohexylene or trans-1,4-cyclohexylene group,
X is H, F, Cl, OCHF$_2$, OCF$_3$, (O)$_s$C$_p$H$_q$F$_r$ wherein s is 0 or 1, p is 2, 3 or 4, and (q+r)=(2p+1), (O)$_s$CY=CX$_1$X$_2$ wherein X$_1$ and Y are each H, F or Cl, and X$_2$ is F or Cl, an alkyl group of 5 or less carbon atoms, or an alkoxy group of 5 or less carbon atoms, and
Y$_1$ and Y$_2$ are each H or F,
L$_1$ and L$_2$ are each F, and
m and n are each 0, 1 or 2;
while at least one compound of said liquid crystal composition has a trans-1-sila-1,4-cyclohexylene or trans-4-sila-1,4-cyclohexylene group.

21. A liquid crystal composition according to claim 20 wherein said one or more compounds of the general formula (VI), (VII), or (VIII) is of the general formula (VI).

22. A liquid crystal composition according to claim 20 wherein said one or more compounds of the general formula (VI), (VII), or (VIII) is of the general formula (VII).

23. A liquid crystal composition comprising at least one compound of general formula (I),

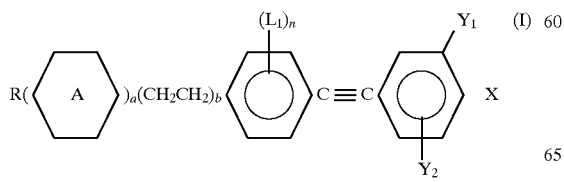

wherein

R is an alkyl group of 1 to 7 carbon atoms, an alkoxyalkyl group of 2 to 7 carbon atoms, a mono- or difluoroalkyl group of 2 to 7 carbons, or an alkenyl group of 2 to 7 carbons,
a and b are each 0 or 1,

is a trans-1-sila-1,4-cyclohexylene, trans-4-sila-1,4-cyclohexylene or trans-1,4-cyclohexylene group,
X is H, F, Cl, OCHF$_2$, OCF$_3$, CF$_3$, (O)$_s$C$_p$H$_q$F$_r$, wherein s is 0 or 1, p is 2, 3 or 4, and (q+r)=(2p+1), (O)$_s$CY=CX$_1$X$_2$ wherein X$_1$ and Y are each H, F or Cl, and X$_2$ is F or Cl, an alkyl group of 5 or less carbon atoms, or an alkoxy group of 5 or less carbon atoms,
Y$_1$ and Y$_2$ are each H or F,
L$_1$ is F, and
n is 0, 1 or 2;
at least one compound of general formula (II),

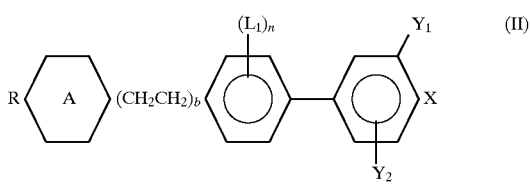

wherein
R is an alkyl group of 1 to 7 carbon atoms, an alkoxyalkyl group of 2 to 7 carbon atoms, a mono- or difluoroalkyl group of 2 to 7 carbon atoms, or an alkenyl group of 2 to 7 atoms,
b is 0 or 1,

is a trans-1-sila-1,4-cyclohexylene, trans4-sila-1,4-cyclohexylene or trans-1,4-cyclohexylene group,
X is H, F, Cl, OCHF$_2$, OCF$_3$, (O)$_s$C$_p$H$_q$F$_r$ wherein s is 0 or 1, p is 2, 3 or 4, and (q+r)=(2p+1), (O)$_s$CY=CX$_1$X$_2$ wherein X$_1$ and Y are each H, F or Cl, and X$_2$ is F or Cl, an alkyl group of 5 or less carbon atoms, or an alkoxy group of 5 or less carbon atoms,
Y$_1$ and Y$_2$ are each H or F,
L$_1$ is F, and
n is 0, 1 or 2;
at least one compound of general formula (III), (IV), or (V),

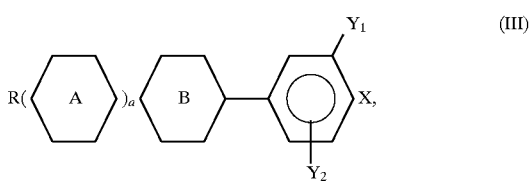

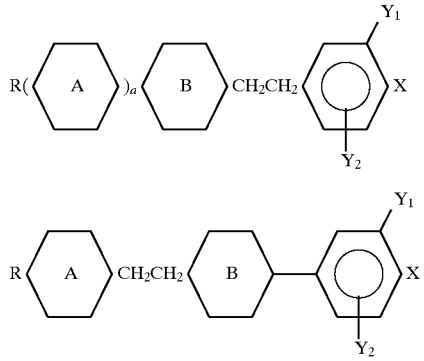 (IV)

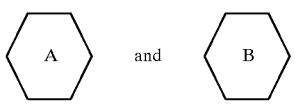 (VIII)

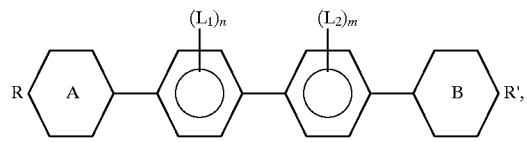 (V)

wherein

R and R' are each an alkyl group of 1 to 7 carbon atoms, an alkoxyalkyl group of 2 to 7 carbon atoms, a mono- or difluoroalkyl group of 2 to 7 carbon atoms, or an alkenyl group of 2 to 7 carbon atoms, b is 0 or 1, R is an alkyl group of 1 to 7 carbon atoms, an alkoxyalkyl group of 2 to 7 carbon atoms, a mono- or difluoroalkyl group of 2 to 7 carbon atoms, or an alkenyl group of 2 to 7 atoms, a is 0 or 1,

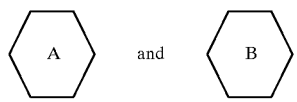

are each a trans-1-sila-1,4-cyclohexylene, trans-4-sila-1,4-cyclohexylene or trans-1,4-cyclohexylene group, X is H, F, Cl, $OCHF_2$, $OCF_3$, $(O)_s C_p H_q F_r$ wherein s is 0 or 1, p is 2, 3 or 4, and $(q+r)=(2p+1)$, $(O)_s CY=CX_1 X_2$ wherein $X_1$ and Y are each H, F or Cl, and $X_2$ is F or Cl, an alkyl group of 5 or less carbon atoms, or an alkoxy group of 5 or less carbon atoms, and $Y_1$ and $Y_2$ are each H or F, $L_1$ and $L_2$ are each F, and m and n are each 0, 1 or 2;

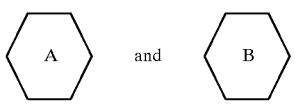

are each a trans-1-sila-1,4-cyclohexylene, trans-4-sila-1,4-cyclohexylene or trans-1,4-cyclohexylene group, X is H, F, Cl, $OCHF_2$, $OCF_3$, $(O)_s C_p H_q F_r$ wherein s is 0 or 1, p is 2, 3 or 4, and $(q+r)=(2p+1)$, $(O)_s CY=CX_1 X_2$ wherein $X_1$ and Y are each H, F or Cl, and $X_2$ is F or Cl, an alkyl group of 5 or less carbon atoms, or an alkoxy group of 5 or less carbon atoms, and $Y_1$ and $Y_2$ are each H or F;

and at least one compound of formula (VI), (VII) or (VIII),

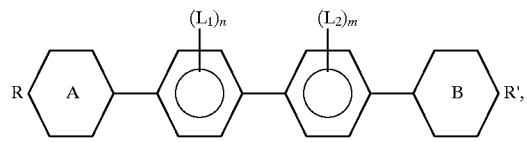 (VI)

while at least one compound of said liquid crystal composition has a trans-1-sila-1,4-cyclohexylene or trans-4-sila-1,4-cyclohexylene group.

24. A liquid crystal composition according to claim 23 wherein said one or more compounds of the general formula (VI), (VII), or (VIII) is of the general formula (VI).

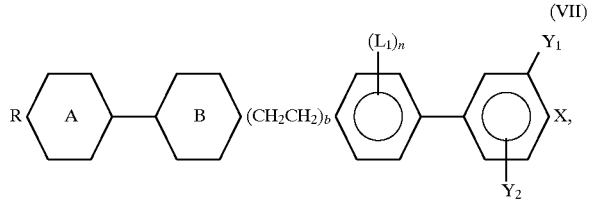 (VII)

25. A liquid crystal composition according to claim 23 wherein said one or more compounds of the general formula (VI), (VII), or (VIII) is of the general formula (VII).

* * * * *